United States Patent
Hagiwara

(10) Patent No.: US 6,310,649 B1
(45) Date of Patent: *Oct. 30, 2001

(54) IMAGE PICKUP APPARATUS IN WHICH STORAGE CONTROL IS SEPARATELY CARRIED OUT FOR EACH FOCUS DETECTION AREA GROUP

(75) Inventor: Shinichi Hagiwara, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/507,525

(22) Filed: Jul. 26, 1995

(30) Foreign Application Priority Data

Jul. 28, 1994 (JP) .................................... 6-176788

(51) Int. Cl.[7] .................................... H04N 5/232
(52) U.S. Cl. ...................... 348/345; 348/294; 348/350
(58) Field of Search .................... 348/207, 218, 348/311, 312, 294, 295, 297, 345, 350, 349; 396/96, 121, 122, 123, 99; H04N 5/335

(56) References Cited

U.S. PATENT DOCUMENTS

| | | |
|---|---|---|
| 4,686,554 | 8/1987 | Ohmi et al. . |
| 5,068,737 * | 11/1991 | Taniguchi et al. ............... 396/96 |
| 5,218,395 | 6/1993 | Taniguchi et al. . |
| 5,227,834 * | 7/1993 | Ishida et al. .................... 396/96 |
| 5,272,328 | 12/1993 | Furukawa ..................... 250/208.1 |
| 5,502,538 * | 3/1996 | Ogasawara ..................... 348/297 |
| 5,572,280 * | 11/1996 | Yagi .............................. 396/96 |
| 5,594,501 * | 1/1997 | Suzuki ........................... 348/362 |

FOREIGN PATENT DOCUMENTS

| | | |
|---|---|---|
| 60-12759 | 1/1985 | (JP) . |
| 60-12760 | 1/1985 | (JP) . |
| 60-12761 | 1/1985 | (JP) . |
| 60-12762 | 1/1985 | (JP) . |
| 60-12763 | 1/1985 | (JP) . |
| 60-12764 | 1/1985 | (JP) . |
| 60-12765 | 1/1985 | (JP) . |

* cited by examiner

Primary Examiner—Tuan Ho
(74) Attorney, Agent, or Firm—Fitzpatrick, Cella, Harper & Scinto

(57) ABSTRACT

An image pickup apparatus includes: a plurality of line sensor groups, each line sensor group including a plurality of line sensors, each line sensor including a plurality of photoelectric conversion elements; and a circuit for performing storage control associated with said photoelectric conversion elements, said storage control being performed separately for each line sensor group using a storage control level that is adjusted separately for each line sensor group, thereby performing AGC control associated with the photoelectric conversion elements.

16 Claims, 25 Drawing Sheets

| FIG. 5A |
| FIG. 5B |

| FIG. 21A |
| FIG. 21B |

IMAGE PICKUP APPARATUS IN WHICH STORAGE CONTROL IS SEPARATELY CARRIED OUT FOR EACH FOCUS DETECTION AREA GROUP

BACKGROUND OF THE INVENTION

1. Field of the Invention

The present invention relates to a camera, a storage control device for use in combination with a photoelectric conversion device, and a focus detecting device. More particularly, the present invention relates to a storage control device used in combination with a photoelectric conversion device, that is suitable for use in an auto focus detecting device of a camera or a video camera.

2. Description of the Related Art

A conventional focus adjustment apparatus has a sensor including a plurality of focus detection areas and a plurality of photoelectric conversion devices corresponding to the respective focus detection areas.

The storage control of the sensor is performed according to a method called AGC. In this method, the storage control is performed separately for each focus detection area by comparing AGC information corresponding to the amount of illumination light with a reference level.

The reference level is set so that the storage control is performed without saturation of an image signal output. The reference level can be selected from a plurality of values that have been defined previously so as to achieve an optimum combination of a reference level and an image signal amplification gain selected from a plurality of values that have been defined previously.

U.S. Pat. No. 5,218,395 discloses a focus detecting device including: first and second focus detection blocks; and monitor elements for monitoring the amount of incident light, the monitor elements being disposed adjacent to the respective focus detection blocks, wherein the charge storage times of the focus detection blocks are controlled according to the output of the corresponding monitor elements thereby detecting the focusing condition of a lens mounted on a camera.

In focus detecting devices of the type in which storage control is performed separately for two or more focus detection blocks as in the technique cited above, the reference level should be set so that when light coming from an object to be detected strikes equally all focus detection blocks, the image signals output by the line sensors are all equal to each other so as to provide good focus detection accuracy.

In practice, however, the image signal output varies owing to the following factors: performance variation of an imaging optical system used to project optical images of the focus detection areas onto the sensor; variation within a sensor in sensitivity or the ratio of AGC information to the image signal output; and performance variation from sensor to sensor. In general, the latter factor has the most significant influence.

FIG. 22 illustrates a common AGC operation. Referring to this figure, the variation in performance among focus detection blocks in a sensor will be described below. In FIG. 22, the horizontal axis represents storage time, and the vertical axis represents output voltages associated with the AGC information.

Voltages SA, SB, SC, and SD are reference levels that are defined depending on predetermined image signal gains. These reference levels are set so that when an AGC information signal reaches a reference level, if an image signal is amplified with a gain corresponding to that reference level, the amplified image signal is always equal regardless of which reference level is selected.

AGC information is read at time GADET. This AGC information is used to determine the gain to be employed in amplification of the image signal. Thus, an optimum image signal gain is selected on the basis of the AGC information read at time GADET, and a corresponding reference level is selected from a group consisting of SA, SB, SC, and SD.

In the example shown in FIG. 22, all three AGC information signals PB1, PB2, and PB3 are greater than SB. Thus, the gain corresponding to the reference level SA is selected in this case, and the output signal of the photoelectric conversion device is read when the AGC information signal reaches level SA thereby obtaining an image signal.

In FIG. 22, time CGSTP denotes an allowable maximum storage time. If the output signal of the photoelectric conversion device is very small and thus the AGC information signal does not yet reach any reference level at time CGSTP, then the storage operation is forced to be terminated.

In the example shown in FIG. 22, the focus detecting device includes three focus detection blocks wherein storage control is performed separately for each block, and each focus detection block is illuminated equally with light so that each focus detection block has equal brightness and contrast. Furthermore, in the example shown in FIG. 22, the characteristic variation of imaging optical systems is much smaller than variations in characteristic of the sensor. The three AGC information signals PB1 to PB3 correspond to the contrast obtained when the focus detection blocks are equally illuminated. However, there is a difference in gradient among these three AGC information signals PB1 to PB3. As a result, storage time, that is the time required for an AGC information signal to reach the selected reference level SA, has a variation among the focus detection blocks. That is, the storage time for the focus detection block having the AGC information signal PB1 is t0, that of PB2 is t1, and that of PB3 is t2.

The variation of the storage time results in a variation of the image signal output. Therefore, in a focus detecting device of the type in which the variation of the image signal output level causes a variation of focus detection accuracy among focus detection blocks, the focus detecting device has separate reference levels corresponding to respective focus detection blocks and each reference level is adjusted separately so that the variation among focus detection blocks and the variation among different focus detecting devices.

FIG. 23 illustrates AGC characteristics obtained by adjusting the AGC characteristics shown in FIG. 22 in the manner described above. The AGC information PB1 is employed as a reference signal, and the reference levels are adjusted separately for PB2 and PB3.

In the case of reference level SA shown in FIG. 22, the image signals output by the focus detection blocks corresponding to PB2 and PB3 may be equal to the image output signal obtained when the signal PB1 reaches SA1 level in FIG. 23 by employing a storage time which is the same as in PB1 or t1. Therefore, SA2 is employed as the reference level for PB2, and SA3 is employed for PB3. For SB1, SC1 and SD1, selection is performed in a similar manner.

In this way, all focus detection blocks for PB1 to PB3 have the same storage time t1, and the image signal output levels become equal to each other.

On the other hand, in focus detection devices of the type in which the above-described variation does not cause a variation of focus detection accuracy among focus detecting blocks, the focus detecting blocks have a common reference level, and this common reference level is adjusted so that the variation of the focus detection accuracy among different focus detecting devices is minimized.

To better meet user's requirements for a focus detecting device, the focus detecting device should have a greater number of focus detection areas than in the above-described example. However, in the focus detecting device having one reference level which is commonly used in all focus detection blocks, it is difficult to obtain a small enough variation among focus detection blocks when the number of focus detection blocks are great. This means that a large variation of focus detection accuracy occurs in a focus detecting device.

One known technique to reduce the above-described variation is to select a sensor so that the variation among focus detection blocks is minimized. However, severe requirements for the sensor cause a reduction in production yield of the sensor, and thus also causes an increase in production cost.

In the case where a focus detecting device has a plurality of reference levels corresponding to respective focus detection blocks and each reference level is adjusted separately, the complexity of a reference level circuit increases and thus greater power consumption is required whereas the variation among focus detection blocks and the variation among different focus detecting devices can be minimized.

SUMMARY OF THE INVENTION

It is an object of the present invention to provide an image pickup apparatus having no problems such as those found in the conventional techniques described above.

According to one aspect of the present invention, there is provided a storage control device associated with photoelectric conversion elements, the storage control device including: a plurality of line sensor groups, each line sensor including a plurality of photoelectric conversion elements; and means for performing storage control associated with the photoelectric conversion elements, the above storage control being performed separately for each line sensor group using a storage control level that is adjusted separately for each line sensor group.

According to another aspect of the present invention, there is provided a focus detection device including: a plurality of line sensors each including a plurality of photoelectric conversion elements; and a plurality of focus detection areas corresponding to respective line sensors, wherein the plurality of focus detection areas are grouped into a plurality of focus detection area groups; the focus detection device including means for performing storage control associated with the photoelectric conversion elements, the storage control being performed separately for each focus detection area group using a storage control level that is adjusted separately for each focus detection area group.

According to still another aspect of the present invention, there is provided an image pickup apparatus or a camera provided with the focus detecting device according to the previous aspect.

In the storage control device associated with photoelectric conversion elements according to the present invention, the storage control device includes: a plurality of line sensor groups, each line sensor including a plurality of photoelectric conversion elements; and means for performing storage control associated with the photoelectric conversion elements, the above storage control being performed separately for each line sensor group using a storage control level that is adjusted separately for each line sensor group. In this storage control device, one reference level is commonly used in line sensors included in one line sensor group, and thus the AGC control can be performed for a great number of line sensors using a small number of reference level adjustment circuits equal to the number of line sensor groups.

In the focus detection device according to the present invention, the device includes: a plurality of line sensors each including a plurality of photoelectric conversion elements; and a plurality of focus detection areas corresponding to respective line sensors, wherein the plurality of focus detection areas are grouped into a plurality of focus detection area groups, and the storage control associated with the photoelectric conversion elements is performed separately for each focus detection area group using a storage control level that is adjusted separately for each focus detection area group. In this focus detection device, one reference level is commonly used in one focus detection group, and thus the AGC control can be performed for a great number of focus detection areas using a small number of reference level adjustment circuits equal to the number of focus detection groups.

In the image pickup apparatus or camera according to the present invention, focus detection is performed using the focus detection device according to the invention so that high accuracy is achieved in the focus detection over all focus detection areas by the AGC control associated with the photoelectric conversion elements. These and other objects will become apparent to those skilled in the art after reading the following description along with the accompanying drawings.

DESCRIPTION OF THE PREFERRED EMBODIMENTS

Referring to the accompanying drawings, preferred embodiments of the present invention are described below.
Embodiment 1

Figure 1:
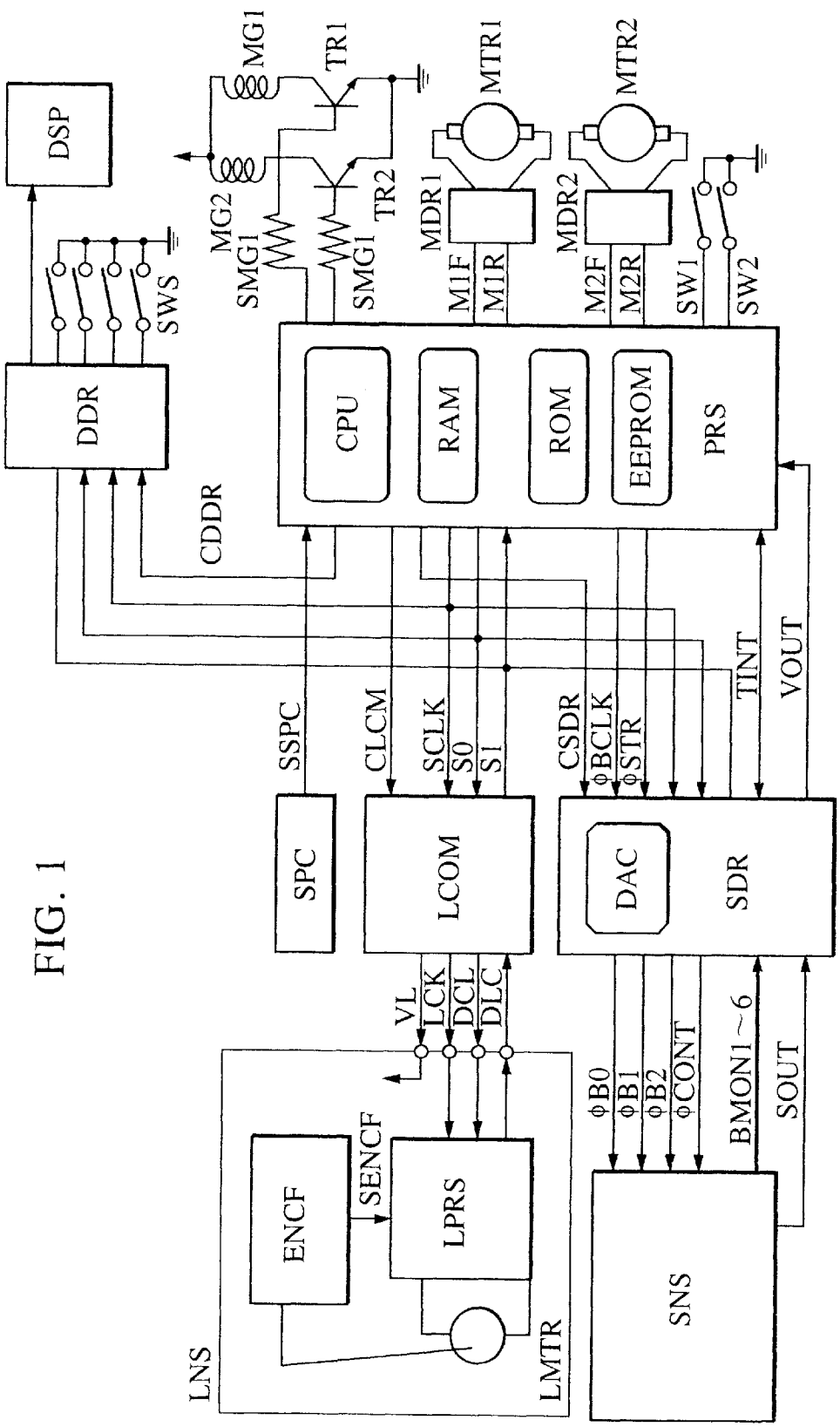
FIG. 1 is a block diagram of a first embodiment of a camera according to the present invention wherein an optical system as well as an electric circuit included in the camera is shown.

FIG. 1 is a block diagram of a first embodiment of the present invention, wherein the invention is applied to a camera in this embodiment. The camera includes various elements as described below. In FIG. 1, PRS denotes a controller of the camera. A specific example of the controller PRS is a one-chip computer (hereafter referred to simply as a computer) including, for example, a CPU (central processing unit), a ROM, a RAM, an EEPROM (electrically erasable and programmable ROM), an A/D converter (not shown), and input/output ports. According to a sequential camera program stored in the ROM, the computer PRS controls various operations such as automatic exposure control, automatic focus adjustment, and winding and rewinding of a film. The EEPROM stores individual difference adjustment information, wherein this information is used to minimize the variation among different cameras in various factors associated with for example automatic exposure control and automatic focus adjustment. The computer PRS adjusts these factors according to values stored in the EEPROM so as to minimize the individual difference, and then communicates with peripheral circuits installed in the main body of the camera and also with a controller in a lens system using communication signals SO, SI, and SCLK, and communication selection signals CLCM, CSDR1, CSDR2, CSDR3 (CSDR 1 through CSDR 3 are generally denoted by CSDR in FIG. 1), and CDDR, thereby controlling the operations of the above circuits and the operation of the lens system.

In the communication signals, SO is a data signal output by the computer PRS, SI is a data signal input to the computer PRS, and SCLK is a clock signal used to control the signals SO and SI.

In FIG. 1, LCOM is a lens communication buffer circuit. When the camera is in operation, the lens communication buffer circuit LCOM supplies electric power to the lens system via a lens power terminal VL. Furthermore, if a selection signal CLCM provided by the computer PRS is at a high level (H-level), the lens communication buffer circuit acts as a communication buffer between the camera and the lens system.

If the computer PRS makes CLCM high (H), and sends data via SO in synchronization with SCLK, then the buffer circuit LCOM sends buffer signals LCK and DCL corresponding to SCLK and SO, respectively, to the lens system via a camera-to-lens interface. Similarly, the buffer circuit LCOM outputs a buffer signal SI corresponding to a signal DLC received from the lens system, and thus the computer PRS receives lens data via SI in synchronization with SCLK.

DDR is a circuit for detecting a switching operation and also for driving a display device. When a signal CDDR is at an H-level, DDR is enabled, and it is operates in response to SO, SI, and SCLK provided by the computer PRS. That is, the circuit DDR switches the condition of a display DSP of the camera according to data provided by the computer PRS. The circuit DDR also notifies the computer PRS of status such as on- and off-states of various control elements in the camera by means of communication.

SW1 and SW2 are switches that operate in response to the operation of a release button (not shown) wherein one end of each switch is grounded and the other end is connected to the computer PRS. The terminals of the computer PRS to which the switches SW1 and SW2 are connected are also connected to a positive terminal of a battery via pull-up resistors (not shown).

If the release button is pressed to a half position by a first pressing operation, the switch SW1 is turned on. If the release button is further pressed by a second pressing operation, the switch SW2 is turned on.

When the switch SW1 is turned on, the computer PRS determines optimum exposure conditions and adjusts focus conditions. Turning on of the switch SW2 triggers the operation of exposure. Then, the film is wound.

If a timer detects that a predetermined amount of time has elapsed, electric power to electric elements is shut off by turning off a transistor.

The switch SW2 is connected to an interrupt terminal of the computer PRS so that if the switch SW2 is turned on even when a program that started in response to turning-on of the switch SW1 is still being executed, the program is interrupted, and another predetermined program starts.

The camera also has a motor MTR1 for feeding a film and a motor MTR2 for moving a mirror upward and downward and also for charging a shutter spring. These motors MTR1 and MTR2 are driven in forward and reverse directions by driver circuits MDR1 and MDR2, respectively. The driver circuits MDR1 and MDR2 control the motors MTR1 and MTR2 according to control signals M1F, M1R, M2F, and M2R received from the computer PRS.

MG1 and MG2 are magnets used to start a forward shutter movement and a backward shutter movement, respectively. These magnets are driven by electric power supplied via transistors TR1 and TR2 which are controlled by signals SMG1 and SMG2 provided by the computer PRS thereby controlling the shutter operation.

The circuit DDR for detecting switching operations and also for driving the display device, the motor driving circuits MDR1 and MDR2, and the shutter control are not essential to the present invention, and thus further details are not described here.

The camera also has a controller LPRS installed in the lens system. A signal DCL is applied to the controller LPRS in synchronization with LCK. The signal DCL includes command data issued by the camera to an imaging lens LNS. Lens operations corresponding to respective commands are defined previously. The controller LPRS analyzes the received command according to a predetermined procedure, and outputs a control signal so as to execute the command such as focus adjustment and diaphragm control, and also output, via DLC, a signal representing the status of each element in the lens system (driving status of a focus adjustment optical system, driving status of the diaphragm).

If the camera issues a focus adjustment command, a focus adjustment motor LMTR moves the focus adjustment optical system along the optical axis according to signals LMF and LMR that are sent together with the focus adjustment command, until achieving good focus. The amount of movement of the optical system is monitored by counting pulses that are generated by an encoder SENCF in such a manner that a pattern of a pulse plate rotating together with the optical system is detected by a photo-coupler thereby generating pulses the number of which corresponds to the amount of the movement of the optical system. If a counter in the circuit LPRS detects that the number of pulses has reached a value set in the circuit LPRS, the circuit LPRS itself lowers the signals LMF and LMR to a low (L) level so as to stop the motor LMTR.

Therefore, once the camera has sent a focus adjustment command, the computer PRS acting as a controller of the camera does not need to do anything concerning the driving of the lens until completion of the lens driving. Furthermore, if the camera issues a request, the content of the counter may also be sent to the camera.

A photosensor SPC detects light coming via the imaging lens from an object to be photographed. The output signal of the photosensor SPC is applied to the computer PRS via an analog input terminal. The received analog signal is converted to a digital signal, and used for automatic exposure control according to a predefined program.

A sensor driving circuit SDR has a DA converter (DAC), and performs various control associated with a sensor SNS in response to signals output by the computer PRS.

The computer PRS communicates with a sensor driver SDR using signals CSDR1, CSDR2, and CSDR3.

The computer PRS sets the communication mode of the sensor driver SDR using a proper combination of signals CSDR1, CSDR2, and CSDR3 as described later, and then transmits data via So in synchronization with SCLK. Furthermore, the computer PRS also receives data SI from the sensor driver SDR.

The data signal SO includes various information depending on the communication mode. For example, the information includes a driving mode of the sensor driver selected from a plurality of modes that are defined previously. The information also includes selection information indication which amplification gain should be used to amplify the image signal. The data signal SO will be described in greater detail later.

In FIG. 1, φSTR is a driving start signal for controlling the sensor SNS. If the sensor driver SDR receives a driving start signal φSTR from the computer PRS, the sensor drive SDR starts a sequence of driving operations including initialization of the sensor SNS, storage, and reading of an image signal wherein the sequence of driving operations is performed in synchronization with φBCLK which is a reference clock signal for the sensor driver SDR.

TINT is a signal transmitted in both directions between the computer PRS and the sensor driver so as to detect and control the termination of storage operations of six line sensors.

The sensor driver SDR amplifies the image signal SOUT output by the sensor SNS according to a gain specified by the data SO and outputs a resultant signal via an output VOUT of the sensor driver SDR. The output signal VOUT is applied to an analog input of the computer PRS. The computer PRS converts the received analog signal into a digital signal, and performs automatic focus processing and other processing according to the obtained digital signal.

Signals φB0, φB1, φB2, φCONT having various combinations of values are applied to the sensor SNS so as to perform initialization of six line sensors forming the sensor SNS, switching between a storage operation and an image signal reading operation, and control of driving timing. Furthermore, the signal φB0 is used to select a pair of photoelectric conversion devices to be used for a reading operation from six pairs of photoelectric conversion devices according to the data signal SO.

BMON1 through BMON6 are used for bidirectional communication between the sensor SNS and the sensor driver SDR.

The sensor SNS outputs signals corresponding to the amounts of light striking the respective line sensors. These signals output via BMON1 to BMON6 correspond to six line sensors of the sensor SNS, respectively.

The sensor driver SDR determines whether the signals BMON1 through BMON6 have reached levels specified by the data signal SO. The sensor driver SDR outputs a signal via TINT to the computer PRS wherein the signal TINT acts as a storage completion signal.

The sensor SNS including six line sensors SNS1 through SNS6 operates in response to the driving signal generated by the sensor driver SDR. Each of the line sensors SNS1 through SNS6 include a pair of sets of photoelectric conversion elements.

Figure 6:
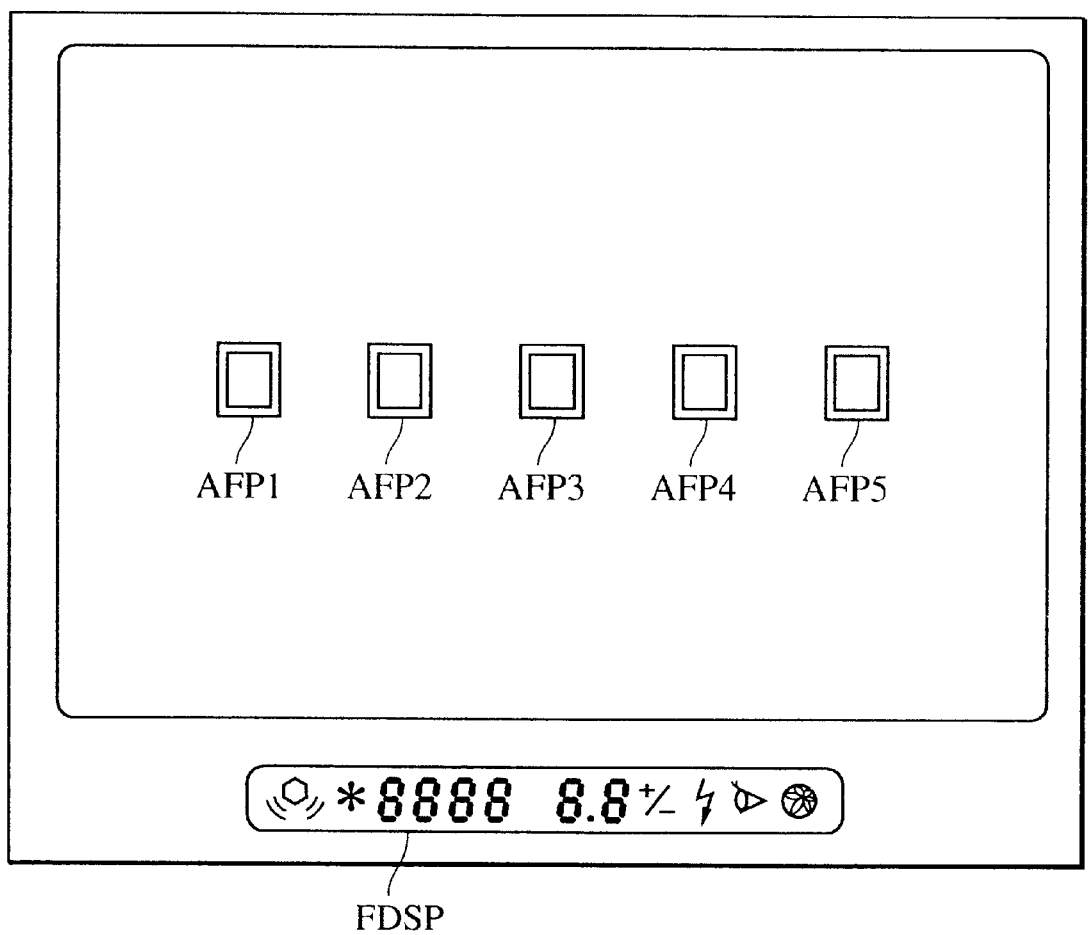
FIG. 6 is a schematic diagram of a viewfinder of the camera.

The line sensors SNS1 through SNS6 are arranged on the same chip at positions corresponding to five focus detection areas on a viewfinder screen shown in FIG. 6. These line sensors SNS1 through SNS6 are controlled by the sensor driver SDR.

Figure 3:
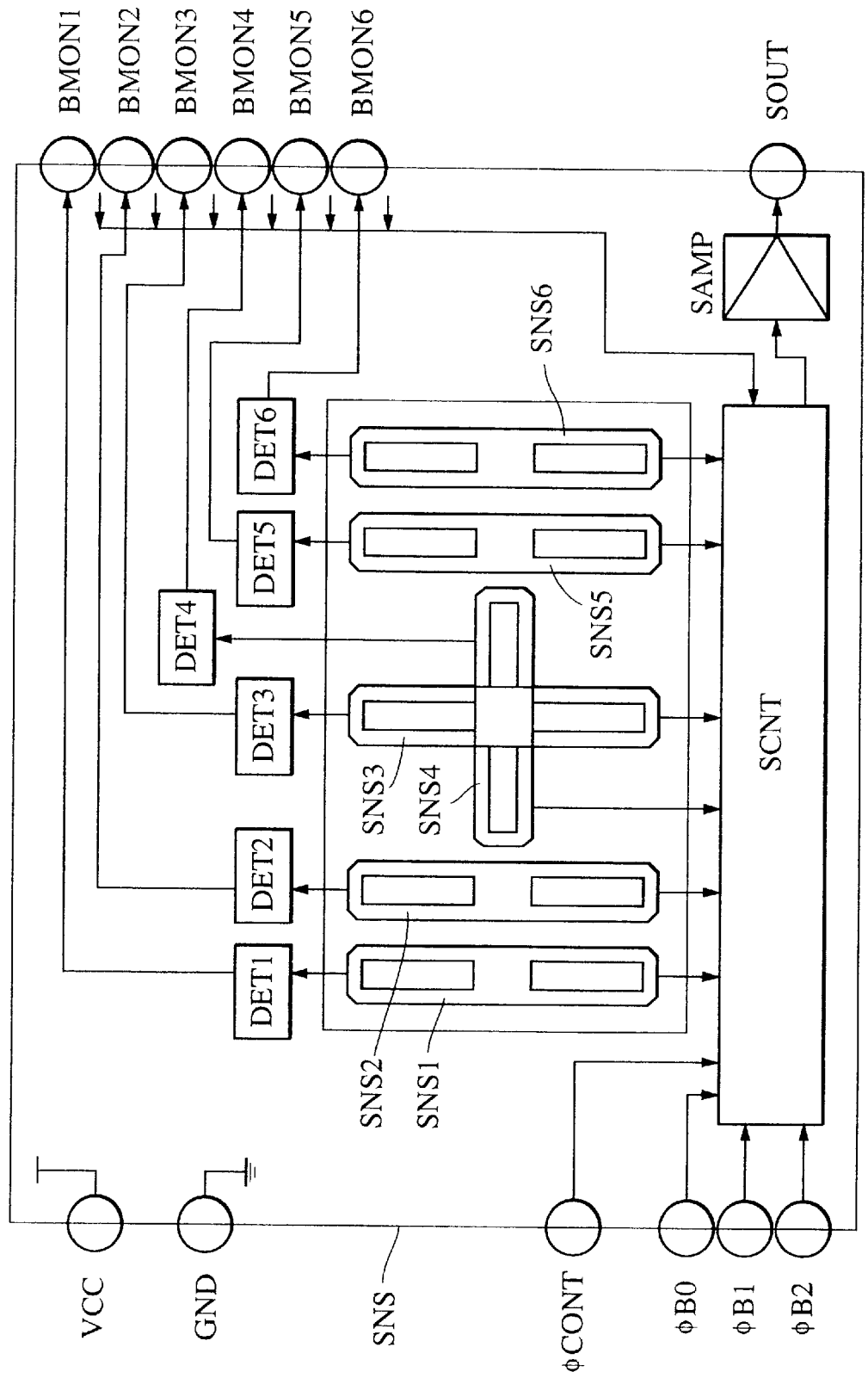
FIG. 3 is a block diagram of the sensor SNS shown in FIG. 1.

The focus detection areas AFP1 through AFP5 correspond to the line sensors SNS1 through SNS6 shown in FIG. 3, respectively. More specifically, AFP1 corresponds to SNS2, AFP2 to SNS1, AFP3 to both SNS3 and SNS4, AFP4 to SNS6, and AFP5 to SNS5.

An image signal is output via SOUT by one of the six line sensors which has been selected previously according to the signal φB0, and applied to the sensor driver SDR.

Figure 2:
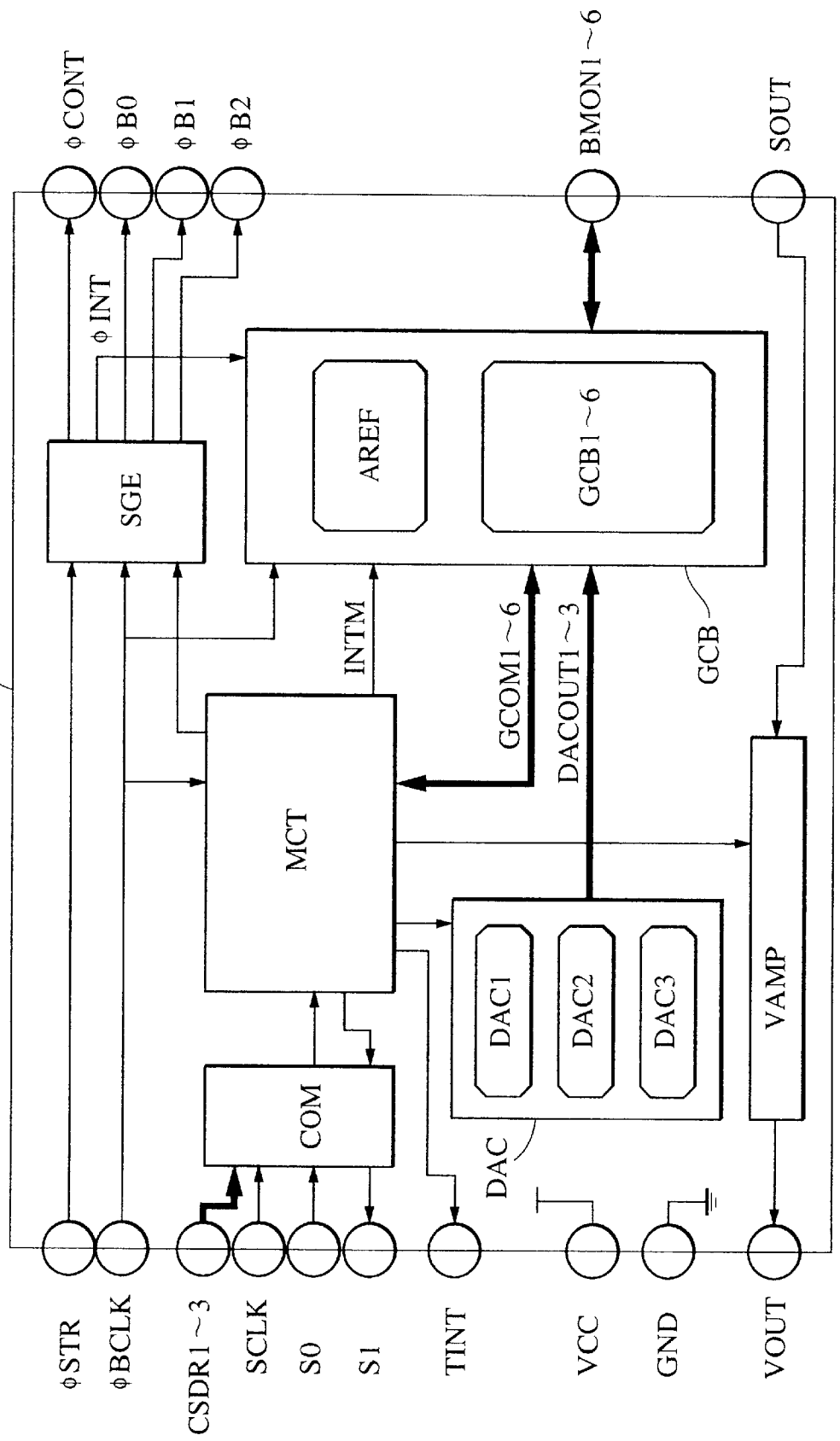
FIG. 2 is a block diagram of the sensor driver SDR shown in FIG. 1.

Referring to FIG. 2, the operation of the sensor driver SDR is described in greater detail below.

A block COM transmits and receives data to and from the computer PRS, wherein the block COM receives driving mode signals CSDR1, CSDR2, and CSDR3 and communication signals SCLK and SO, and outputs a signal SI. When any one of the signals CSDR1, CSDR2, CSDR3 is at an H-level, the signals SCLK, SI, and SO are enabled and the computer PRS communicates with the sensor driver SDR. If some error is detected in data communication, received data is regarded as invalid.

If the data SO received from the computer PRS is regarded as valid, the data SO is transferred to the block MCT and the contents of the data SO are stored in the block MCT until the next reception of data SO.

The block MCT receives information from a block GCB, and transfers the received information to the block COM. The block COM transmits the received information via data SI to the computer PRS.

The block MCT controls blocks DAC, GCB, and VAMP according to the contents of the data SO received from the computer PRS via the block COM. After the sensor SNS starts its operation, the block MCT controls the block VAMP according to the information provided by the block GCB. A signal INTM is used to notify the block GCB of the storage control mode. Signal lines GCOM1 through GCOM6 are communication lines connected to blocks GCB1 through GCB6.

In response to the reference clock signal φBCLK, a block SGE detects the driving signal φSTR that is generated by the computer PRS and that is to be applied to the sensor SNS. According to the information provided by the block MCT and in response to the reference clock φBCLK, the block SGE generates and transmits driving signals φCONT, φB0, B1, B2 to the sensor SNS, and also transmits a signal φINT used to notify the block GCB that the sensor SNS is going to start a storage operation.

through BMON6, the corresponding pair of photoelectric conversion devices transfer stored charges to a charge signal reading part.

The block VAMP amplifies the image signal output by the sensor SNS according to a gain specified by the block MCT, wherein the gain is determined according to the data signal SO provided by the computer PRS. The resultant signal is output as an image signal VOUT.

The data signals SO and SI are received and transmitted from and to the computer PRS in a manner described below. Table 1 represents the contents of the receiving data SO and transmitting data SI in the binary form.

TABLE 1

| MODE CODE | | | ←MSB | | | | | | | LSB→ |
|---|---|---|---|---|---|---|---|---|---|---|
| CSDR3 | CSDR2 | CSDR1 | D17 | D16 | D15 | D14 | D13 | D12 | D11 | D10 |
| A | 0 | 0 | 0 | | | DO NOT CARE | | | | |
| B | 0 | 0 | 1 | DA17 | DA16 | DA15 | DA14 | DA13 | DA12 | DA11 | DA10 |
| C | 0 | 1 | 0 | DA27 | DA26 | DA25 | DA24 | DA23 | DA22 | DA21 | DA20 |
| D | 0 | 1 | 1 | DA37 | DA36 | DA35 | DA34 | DA33 | DA32 | DA31 | DA30 |
| E | 1 | 0 | 0 | CGAI | SITE | ITE6 | ITE5 | ITE4 | ITE3 | ITE2 | ITE1 |
| | | | | | | ITH6 | ITH5 | ITH4 | ITH3 | ITH2 | ITH1 |
| F | 1 | 0 | 1 | SRL3 | SRL2 | SRL1 | | | | GA02 | GA01 |
| G | 1 | 1 | 0 | GL62 | GL61 | GL52 | GL51 | GL42 | GL41 | GL32 | GL31 |
| H | 1 | 1 | 1 | | | | | GL22 | GL21 | GL12 | GL11 |

A block DAC includes three separate DA converters DAC1, DAC2, and DAC3 having substantially the same characteristics.

Each DA converter DAC1 through DAC3 outputs an analog signal which is selected from values in the predefined range according to the digital information provided by the block MCT. The analog signal DACOUT1 output by the DA converter DAC1 is applied to the blocks GCB1 and GCB2. Similarly, the analog signal DACOUT2 of the DA converter DAC2 is applied to the blocks GCB3 and GCB4, and the analog signal DACOUT3 of the DA converter DAC3 is applied to the blocks GCB5 and GCB6.

The block GCB includes a block AREF as well as the blocks GCB1 through GCB6 described above. The block AREF supplies reference signals to the blocks GCB1 through GCB6 wherein the reference signals are used to establish reference levels which are used in a comparison operation in storage control of the sensor SNS.

The blocks GCB1 through GCB6 establish reference levels according to the analog signals output by the block AREF and also according to the analog signals output by the block DAC.

The blocks 1 through 6 all have substantially the same characteristics. In response to the reference clock signal φBCLK, each block separately compares a signal, which is selected from the monitor signals BMON1 through BMON6 according to the information provided by the block MCT, to a reference level which is established according to a corresponding DAC output signal of DACOUT1 through DACOUT3 and also according to AREF. The comparison results are reported to the block MCT.

The output signal of the block DAC1 is commonly used in both blocks GCB1 and GCB2. Similarly, the output signal of the block DAC2 is commonly used in blocks GCB3 and GCB4, and the output signal of the block DAC3 is commonly used in blocks GCB5 and GCB6.

The block GCB outputs signals via BMON1 through BMON6 as required. If a signal is output via one of BMON1

As described above, the sensor driver SDR drives the sensor SNS according to the contents of the data SO received in synchronization with the communication clock signal SCLK. The sensor driver SDR has three communication lines connected to the computer PRS wherein the information represented by the receiving signal SO is changed according to the signals received via these communication lines.

In three modes B, C, and D, the receiving data SO includes information representing how the output voltage of the DA converter should be set. In mode B, the data including DA10 through DA17 represents the information about the output of the DA converter DAC1. In mode C, the data including DA20 through DA27 represents the information about the output of the DA converter DAC2. In mode D, the data including DA30 through DA37 represents the information about the output of the DA converter DAC3.

In mode E, a bit SITE carries information regarding storage operation termination control. This information represents whether the termination of a storage operation of the sensor SNS is performed according to the signal TINT which is provided to the sensor driver SDR from the computer PRS or performed under the direct control of the sensor driver SDR.

If SITE=1, the storage termination is controlled according to the signal TINT provided by the computer PRS. In this case, the storage operations of all line sensors SNS1 through SNS6 are terminated at the same time.

Bits ITH1 through ITH6 carry information about storage control line selection, wherein bits ITH1 through ITH6 correspond to line sensors SNS1 through SNS6, respectively. When some bits of ITH1 through ITH6 are "1", corresponding line sensors are subjected to storage control. Bits ITE1 through ITE6 carry storage completion information, wherein bits ITE1 through ITE6 correspond to line sensors SNS1 through SNS6, respectively. If line sensors complete storage operations under the direct control of the sensor driver SDR, the corresponding bits of ITE1 through ITE6 become 1.

If the computer PRS receives a storage completion signal via TINT according to predefined processing of the image signals SOUT and VOUT, the computer PRS performs communication in mode E so as to detect which line sensor has completed its storage operation.

In mode F, bits SRL1 through SRL3 carry information representing which line sensor of SNS1 through SNS6 should be subjected to image signal reading via SOUT.

Table 2 represents the correspondence between the contents of bits SRL1 through SRL3 and line sensors to be selected.

TABLE 2

| SRL3 | SRL2 | SRL1 | Line Sensor to be Read |
|---|---|---|---|
| 0 | 0 | 0 | Line Sensor 1 |
| 0 | 0 | 1 | Line Sensor 1 |
| 0 | 1 | 0 | Line Sensor 2 |
| 0 | 1 | 1 | Line Sensor 3 |
| 1 | 0 | 0 | Line Sensor 4 |
| 1 | 0 | 1 | Line Sensor 5 |
| 1 | 1 | 0 | Line Sensor 6 |
| 1 | 1 | 1 | Line Sensor 6 |

Bits GA01 and GA02 carry information representing a gain selected from predefined values wherein the image signal SOUT selected according to the contents of bits SRL1 through SRL3 is amplified by the selected gain and output via VOUT.

Table 3 represents the correspondence between the contents of bits GA01 and GA02 and the gain to be selected.

In modes G and H, the data SO carries gain information of each line sensor SNS1 through SNS6. The obtained image signals SOUT and VOUT are processed according to this information.

Bits GL62 and GL61 carry gain information of the line sensor 6, wherein these are equal to the gains GA01 and GA02, respectively, as represented also in Table 3. Bits GL52, GL51 through GL12, and GL11 carry gain information in a similar manner.

TABLE 3

| GL × 2 or GA02 | GL × 1 or GA01 | Amplification Gain |
|---|---|---|
| 0 | 0 | ×1 |
| 0 | 1 | ×2 |
| 1 | 0 | ×4 |
| 1 | 1 | ×8 |

Now referring to FIG. 8, timing of communication between the computer PRS and the sensor driver SDR shown in FIG. 1 is described below.

Figure 8:
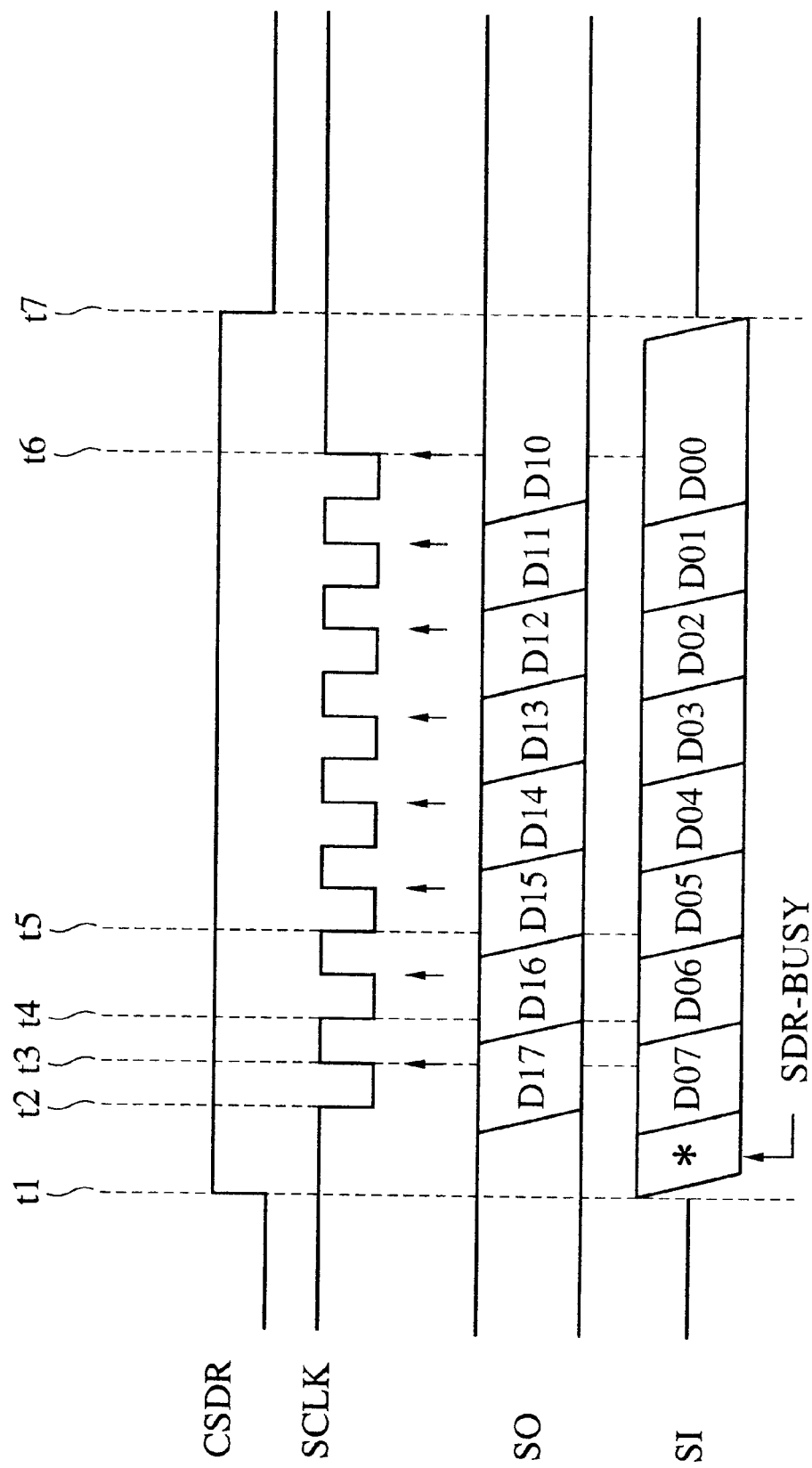
FIG. 8 is a timing chart associated with communication.

In FIG. 8, CSDR generally denotes signals CSDR1, CSDR2, and CSDR3. As can be seen from FIG. 8, communication between the computer PRS and the sensor driver SDR is allowed when none of the signals CSDR1, CSDR2, and CSDR3 is at an L-level.

At time t1, CSDR rises up to an H-level so that the sensor driver SDR is selected as a device with which the computer PRS communicates. In response to the detection of the low-to-high transition of CSDR, the sensor driver SDR goes to a waiting state in which the sensor driver SDR waits for a communication clock signal SCLK.

At time t2, SCLK falls down to an L-level whereby the output bit D07 of the output data line SI of the sensor driver SDR is established.

At time t3, SCLK rises up to an H-level. In response to this transition, the sensor driver SDR receives the output bit D17 of the output data SO from the computer PRS.

At time t4 the sensor driver SDR outputs D06 via the data line SI, and then the sensor driver SDR receives output data SI from the computer PRS at time t5 in a manner similar to that at times t2 and t3. At time t6, D10 is received and thus acquisition of 8-bit data is completed.

Furthermore, at time t7, CSDR falls down and communication between the sensor driver SDR and the computer PRS is completed.

Referring to FIG. 3, the sensor SNS is described in further detail below.

In this embodiment, the sensor SNS is constructed according to the technology disclosed in Japanese Patent Applications Laid-Open Nos. 60-12759 to 60-12765. That is, the sensor SNS is constructed with storage type photosensor consisting of a phototransitor array. In this photosensor array, unlike conventional CCD sensors or MOS sensors, a charge proportional to the amount of incident light is accumulated in a base area of each transistor, and a signal corresponding to the amount of the accumulated charge is read out for each sensor array.

The operation of a single photoelectric conversion element of this type is disclosed in Japanese Patents cited above, and thus it will not be described here in further detail.

The sensor SNS includes six line sensors SNS1 through SNS6 and acts as a photosensor device of the focus detection device.

Each line sensor SNS1 through SNS6 includes two series of photoelectric conversion elements. The six line sensors are arranged on the same chip at positions corresponding to respective distance measurement points on a viewfinder screen shown in FIG. 6. The line sensor SNS4 uses the same area on the viewfinder of the camera as the line sensor SNS3.

The charge signal output of each line sensor SNS1 through SNS6 is applied to the block SCNT. Initialization, storage, and reading operations are controlled by signals φCONT, φB0, φB1, and φB2 that are applied to the line sensors SNS1 through SNS6 via the block SCNT.

Blocks DET1 through DET6 extract information from line sensors SNS1 through SNS6, respectively, wherein the extracted information is used for storage control.

The information is extracted in such a manner so as to detect minimum and maximum output signals from a plurality of output signals of photoelectric conversion elements forming each line sensor.

The maximum output signal is compared with a saturation level that has been defined previously so as to determine whether saturation occurs in the output of the photoelectric conversion element. If saturation occurs, then the sensor SNS outputs a signal via a corresponding terminal of BMONL through BMON6 so as to notify the sensor driver SDR of the saturation.

Furthermore, the difference between the maximum output and the minimum output, that is a contrast component, is detected and output via a corresponding terminal of BMON1 through BMON6.

As described earlier, bidirectional communication between the sensor SNS and the sensor driver SDR is performed via BOM1 through BMON6, wherein if a signal is sent from the sensor driver SDR to the sensor SNS, the received signal is applied to the block SCNT.

The block SNCT also reads an image signal. However, the image signal read by the block SNCT is very weak, and is easily disturbed by an external noise. Therefore, the image signal is amplified by the block SAMP to a predetermined level and then output via SOUT thereby reducing the effect of external noise.

Now referring to FIG. 7, the imaging optical system used in the focus detection device will be described below.

After passing through an imaging lens of the camera, a light beam passes through another two lenses and a diaphragm (not shown) and finally reaches the sensor.

The lens AFFL is disposed at a position corresponding to the focus position of the camera. The light beam that has passed through the lens AFFL is divided into two beams by the lens AFDL. These two beams are projected onto the sensor SNS.

Figure 7:
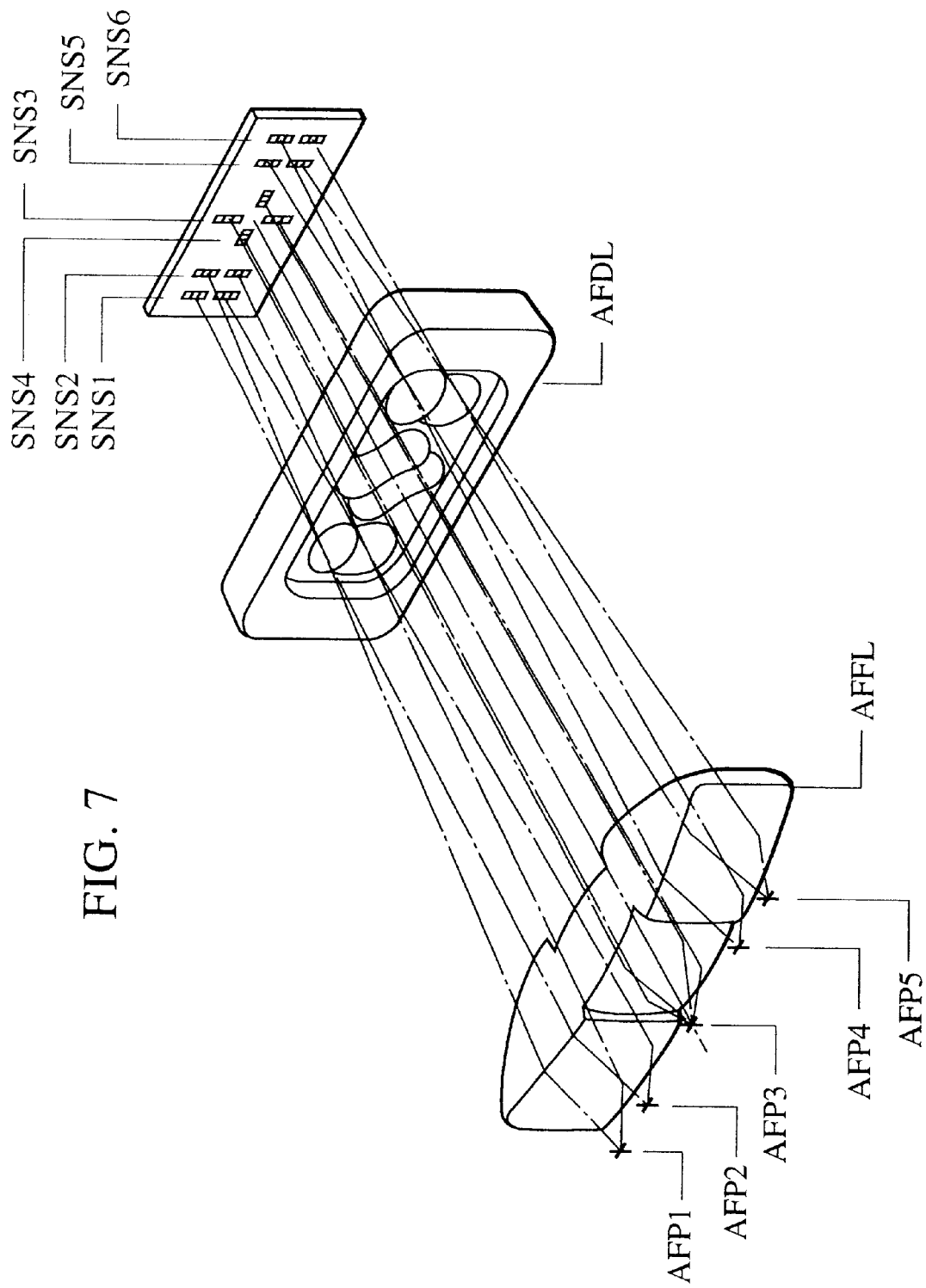
FIG. 7 is a schematic representation of the principle of an optical system used for focus detection.

In FIG. 7, AFP1 through AFP5 denotes positions corresponding to the focus detection areas shown in FIG. 6 wherein the same notations are used to represent the correspondence in positions.

Referring to FIG. 7, the correspondence between the positions AFP1 through AFP5 and the line sensors of the sensor SNS is described in further detail below. The optical images of AFP1 and AFP2 are projected onto the sensor SNS via the same part of the lens AFFL and also the same part of the lens AFDL. As a result, the optical images of AFP1 and AFP2 are projected onto the sensor SNS at symmetrical positions. Thus, AFP1 is projected onto the line sensor SNS2, and AFP2 is projected onto the line sensor SNS1. Similarly, AFP4 and AFP5 are projected onto SNS6 and SNS5, respectively. AFP3 is divided by the lens AFDL into two light beam components which are perpendicular to each other, and these light beam components are projected onto the line sensors SNS3 and SNS4.

Figure 4:
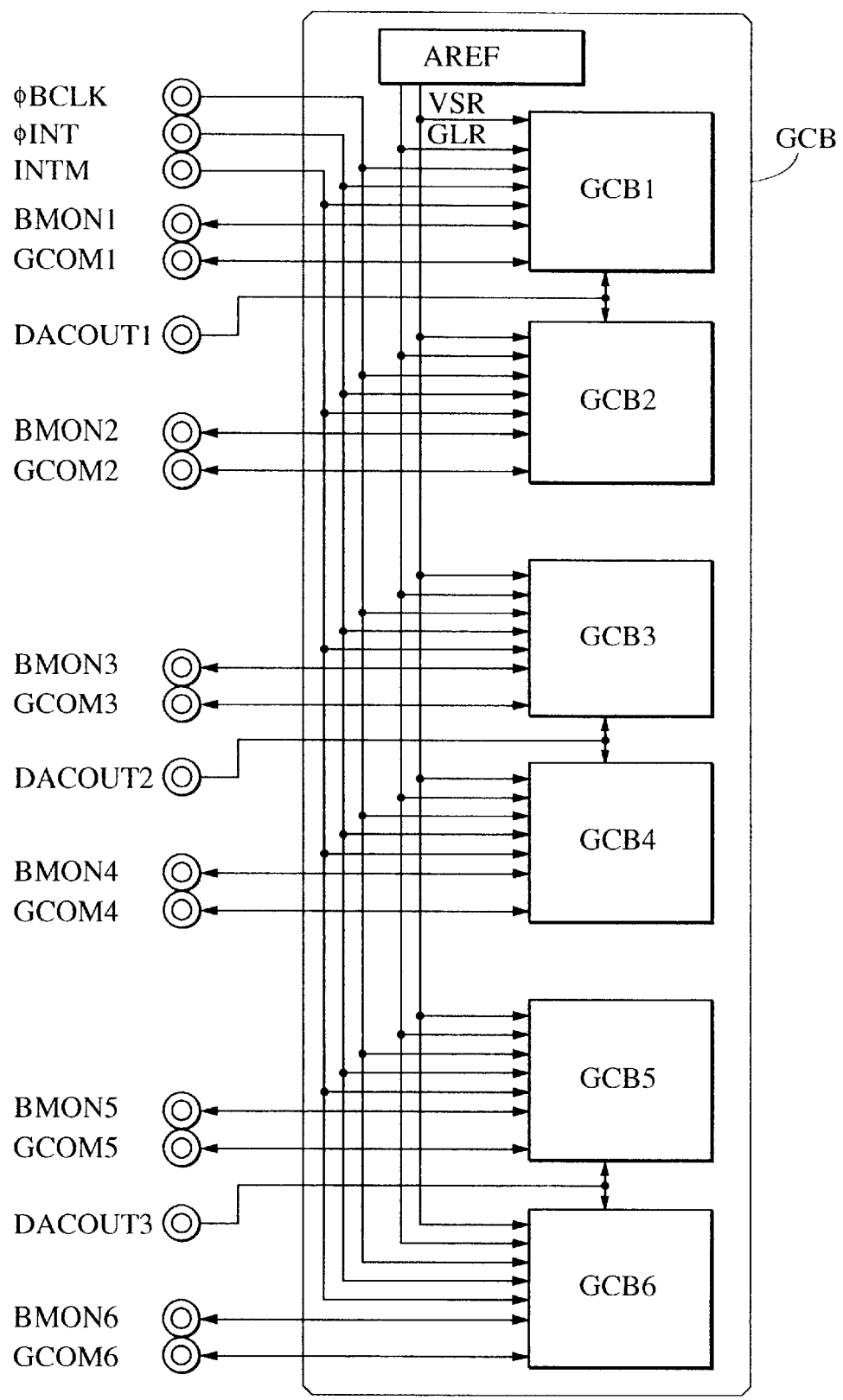
FIG. 4 is a circuit diagram in block form illustrating a block shown in FIG. 2 in greater detail.
Figures 5, 5A:
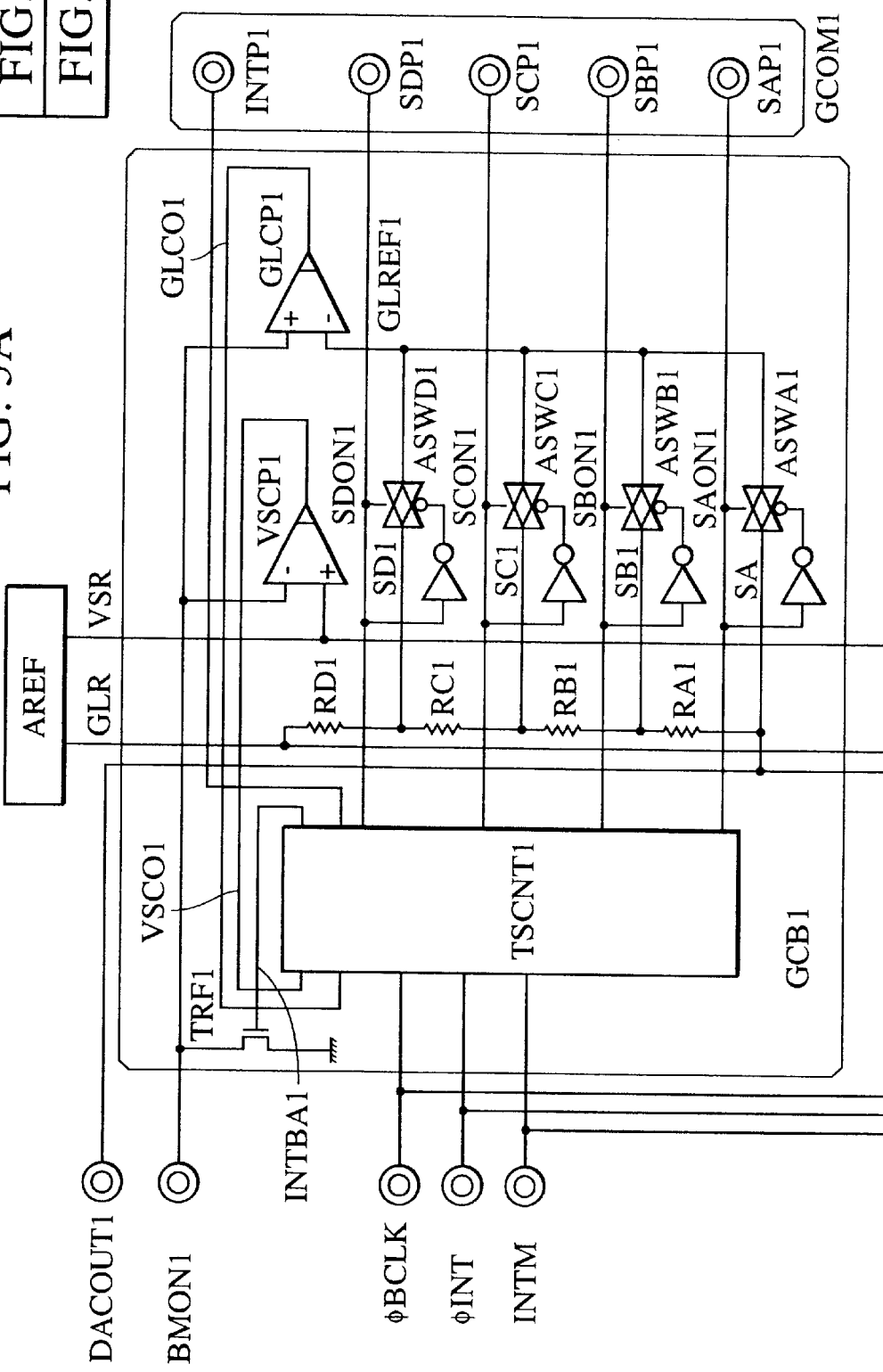
FIG. 5, consisting of FIGS. 5A and 5B, is a circuit diagram in block form illustrating a circuit block shown in FIG. 4 in greater detail.
Figure 5B:
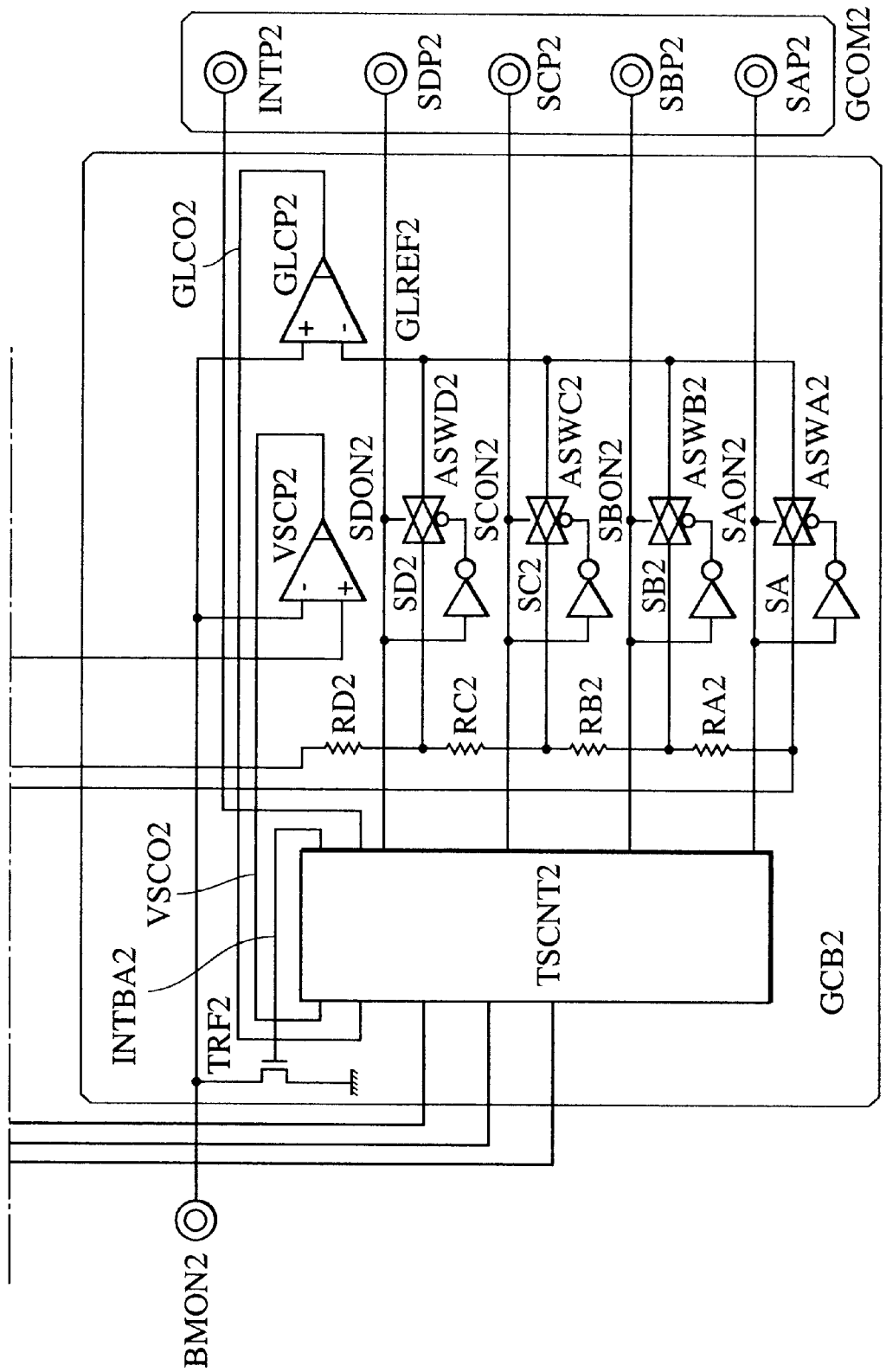

Referring to FIGS. 4 and 5, the block GCB which is one of the blocks forming the sensor driver SDR is described in further detail below.

FIG. 4 illustrates the block GCB shown in FIG. 2 and input and output signals of the block GCB. FIG. 5 illustrates the block GCB1 and GCB2 shown in FIG. 4 in greater detail.

Now, FIG. 4 is referred to.

In FIG. 4, the blocks GCB1 through GCB6 are constructed in the same manner, and these blocks correspond to the six line sensors of the sensor SNS, respectively.

The block AREF generates reference levels wherein its outputs GLR and VSR are connected in parallel form to the block GCB1 through GCB6.

Signals φBCLK, φINT, and INTM are applied to GCB from the outside and further applied in parallel form to the blocks GCB1 through GCB6.

GCOM1 through GCOM6 and BMON1 through BMON6 are connected to the blocks GCB1 through GCB6, respectively. In FIG. 4, GCOM1 through GCOM6 generally denote a plurality of signal lines connected to the block MCT, which will be described later in more detail in connection with FIG. 5.

Storage control signals are transmitted via BMON1 through BMON6 in both directions between GCB and the sensor SNS.

The outputs DACOUT1 through DACOUT3 of three blocks DAC1 through DAC3 that form the DA converter block DAC shown in FIG. 2 are connected to the block GCB in such a manner that the output DACOUT1 is connected in parallel form to the blocks GCB1 and GCB2, the output DACOUT2 is connected in parallel form to the blocks GCB3 and GCB4, and the output DACOUT3 is connected in parallel form to the blocks GCB5 and GCB6.

Now, FIG. 5 is referred to.

For convenience, the blocks GCB3 through GCB6 are not shown in FIG. 5. However, signals CLR, VSR, φBCLK, φINT, INTM are connected not only to the blocks GCB1 and GCB2 but also to the GCB3 through GCB6.

In response to the input signals φBCLK, φINT, φNTM, VSCO1, and GLCO1, the block TSCNT1 generates output signals SDP1, SCP1, SBP1, SAP1 to switch the level of GLREF1, an output signal INTBA1 to turn on and off a transistor TRF1, and an output signal INTP1. If the block TSCNT1 detects a low-to-high transition of φINT in response to φBCLK, a storage operation starts. The storage operation is completed separately for each line sensor. When the storage operation of the line sensor SNS1 is completed, a signal indicating that the storage operation is complete is output via INTP1.

As shown in FIG. 5, BMON1 is connected in parallel fashion to comparators VSCP1 and GLCP1. A signal VSR serving as a comparison reference level signal generated by the block AREF is applied to the other input of the comparator VSCP1. The other input of the comparator GLCP1 is connected to one of the voltages SB1, SC1, and SD1 generated by dividing the voltage given as a difference between GLR and the output voltage SA of the DACOUT1 wherein the above voltage division is performed using resistors RA1, RB1, RC1, and RD1.

The output GLR of the block AREF is connected in parallel form to the block GCB1 through GCB6 and acts as a low reference level used for storage control of the sensor SNS.

The output GLR is maintained at a constant level corresponding to the maximum monitor signal level in the allowable range in which no saturation of the image signal occurs.

The output VSR of the block AREF acts as a reference level used to detect a monitor signal which appears at one of BMON1 through BMON6 when storage operations of line sensors of the sensor SNS are terminated without the AGC control via GCB1 through GCB6 corresponding to the respective line sensors.

The value of the output VSR is set so that it is less than the monitor signal output obtained when the line sensor is initialized, that is, the corresponding output signal of BMON1 through BMON6. When the storage operation is completed, the monitor signals BMON1 through BMON6 are lowered down to a GND level. In response to this transition, the output VSCO1 of the comparator VSCP1 changes from an L-level to an H-level.

The comparator GLCP1 detects the output level of the monitor signal BMON1 during a storage operation. The change in the output GLCO1 of the comparator GLCP1 is applied to the block TSCNT1. If the signal level of BMON1 increases, and thus the block TSCNT1 detects a change in the output GLCO1, then the comparison reference level GLREF1 is switched to the next level.

SA, SB1, SC1, and SD1 are output when corresponding analog switches ASWA1, ASWB1, ASWC1, and ASWD1 are turned on.

The signal level of SA is the same as that of DACOUT1, and is commonly used in GCB1 and GCB2.

The on-off operations of the analog switches ASWA1, ASWB1, ASWC1, and ASWD1 is controlled by SAON1, SBON1, SCON1, and SDON1, respectively, wherein two or more switches are not turned on at the same time.

On-off signals of the analog switches described above are output via SAP1, SBP1, SCP1, and SDP1, respectively, so that the block MCT can know which analog switch is turned on.

A storage completion signal is output via INTP1 wherein the storage completion signal is obtained as a result of the operation performed by the block TSCNT1 according to VSCP1 and GLCP1.

A signal INTBA1 is applied to the gate of a transistor TRF1, wherein the signal INTBA1 is obtained as a result of an operation performed by the block TSCNT1 according to VSCP1 and GLCP1, thereby lowering the voltage of BMON1 to the GND level. BMON1 is also used to terminate the storage operation of the line sensor SNS1 of the sensor SNS in such a manner that if BMON1 is lowered to the GND level by an external signal then the storage operation of the line sensor SNS1 is terminated.

GCOM1 includes the above-described signals SAP1, SBP1, SCP1, SDP1, and INTP1.

Figure 9:
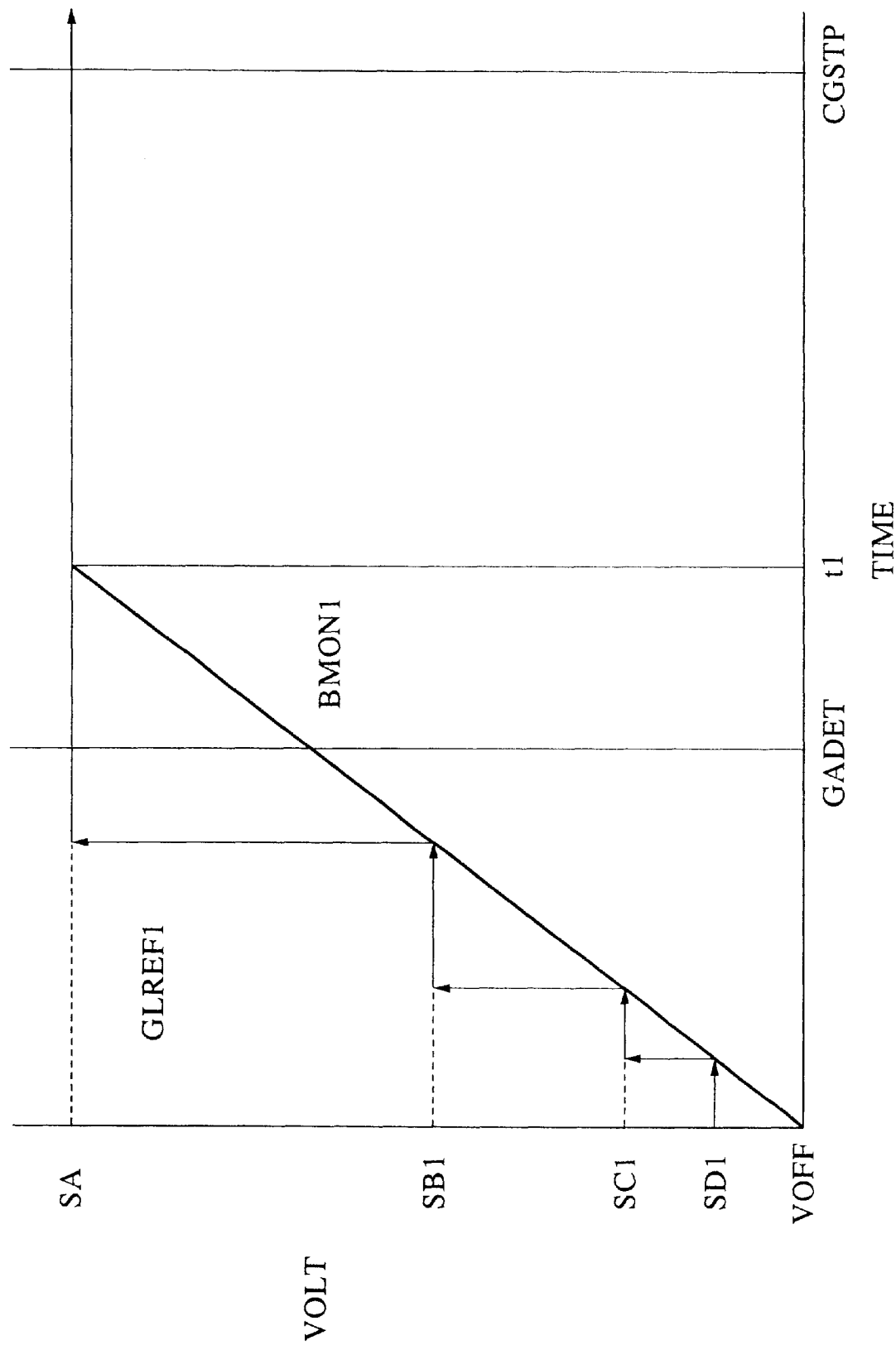
FIG. 9 is a graph illustrating a relationship between reference levels of a comparator and storage monitor signals.

Now, FIG. 9 is referred to.

FIG. 9 illustrates the relationship between the reference level GLREF1 of the comparator GLCP1 of the block GCB1 shown in FIG. 5 and the storage monitor signal BMON1, wherein the vertical axis VOLT represents voltage, and the horizontal axis TIME represent storage time.

Voltage $V_{OFF}$ is an output level of BMON1 obtained when the sensor SNS is reset.

At time GADET, the output level of the monitor signal BMON1 is detected wherein the gain associated with the image signal amplification is selected according to the detected output level.

The high-to-low transition of the signal INTM is detected in synchronization with $\phi$BCLK.

CGSTP denotes a maximum storage time.

The high-to-low transition of the signal INTP1 is detected in synchronization with $\phi$BCLK.

At time t1, the storage operation of the pair of photoelectric conversion elements providing the monitor signal BMON1, that is the line sensor 1, is completed. The output signal corresponding to the output signal of the photoelectric conversion elements obtained at this time is read out as an image signal.

Figure 10:
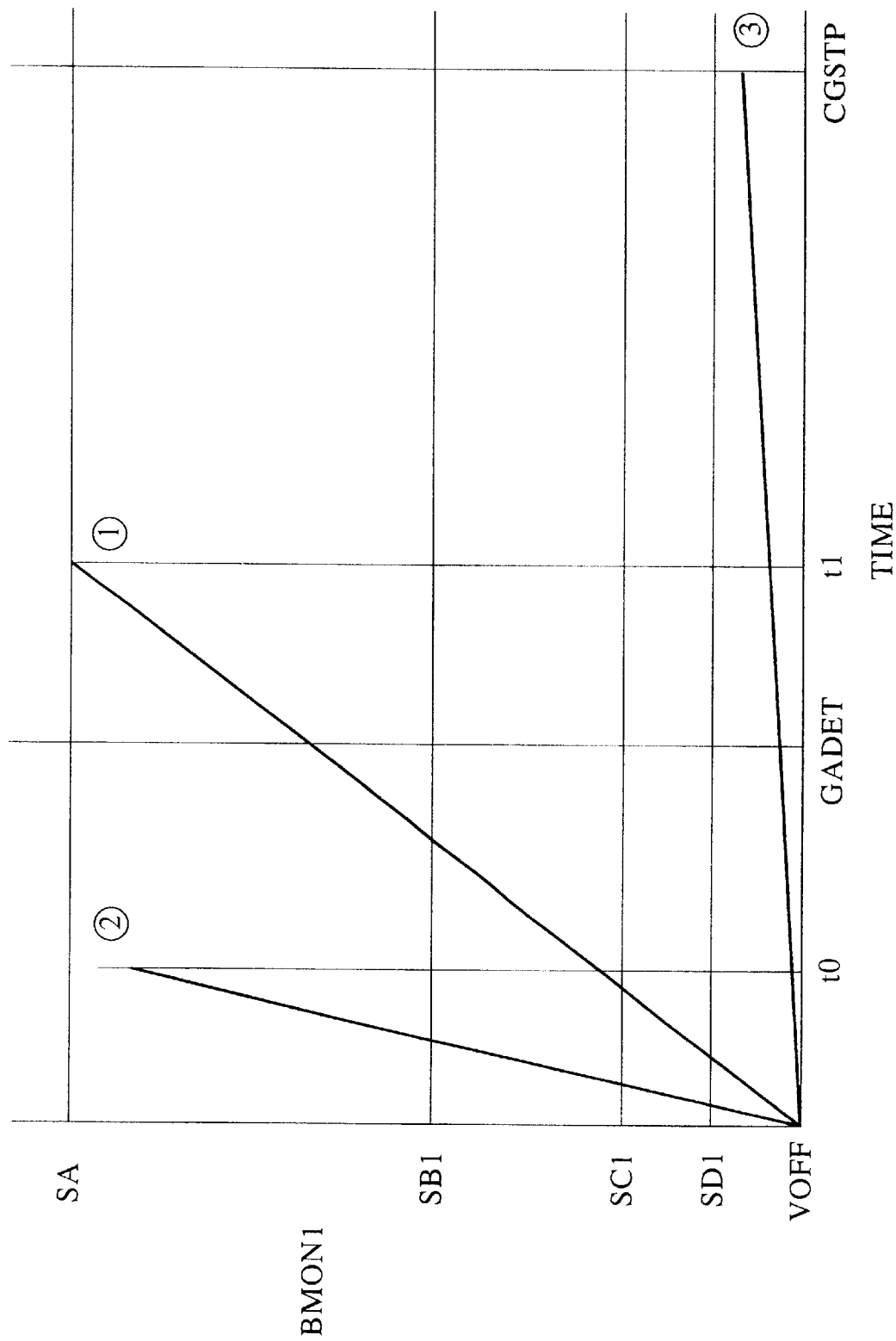
FIG. 10 is a plot of storage monitor signal for various conditions.

Now, FIG. 10 is referred to.

Whereas FIG. 9 illustrates the monitor signal output voltage BMON1 for a constant amount of light striking the line sensor 1, FIG. 10 illustrate the monitor signal output voltage BMON1 for various amounts of light which also includes the case shown in FIG. 9.

Line 1 illustrates the same characteristic line associated with the monitor signal output voltage BMON1 as FIG. 9. In this case, the image signal amplification gain is selected so that the monitor signal output voltage obtained at time GADET falls within the range of SA level.

In the case of line 2, the storage operation is terminated at time t0. Since time t0 is earlier than time GADET, an amplification gain corresponding to SA level is selected in this case. However, the storage operation is terminated before the monitor signal output voltage reaches SA level. As a result, the image signal amplified by the gain corresponding to SA level will be lower than line 1. In such a case, the photoelectric conversion element is illuminated with very bright light, and thus an operation to avoid saturation starts, as a result of which the storage operation is terminated just before saturation.

In the case of line 3, the storage operation is terminated at the maximum storage time CGSTP. In this case, the monitor signal output voltage obtained at time GADET falls within SD1 level range and thus an amplification gain corresponding to SD1 level is selected. However, the final monitor signal output voltage does not reach SD1 level, the image signal output voltage amplified by the selected gain will be lower than line 1. In this case, the photoelectric conversion element is illuminated with vary dark light or low-contrast light.

Figure 11:
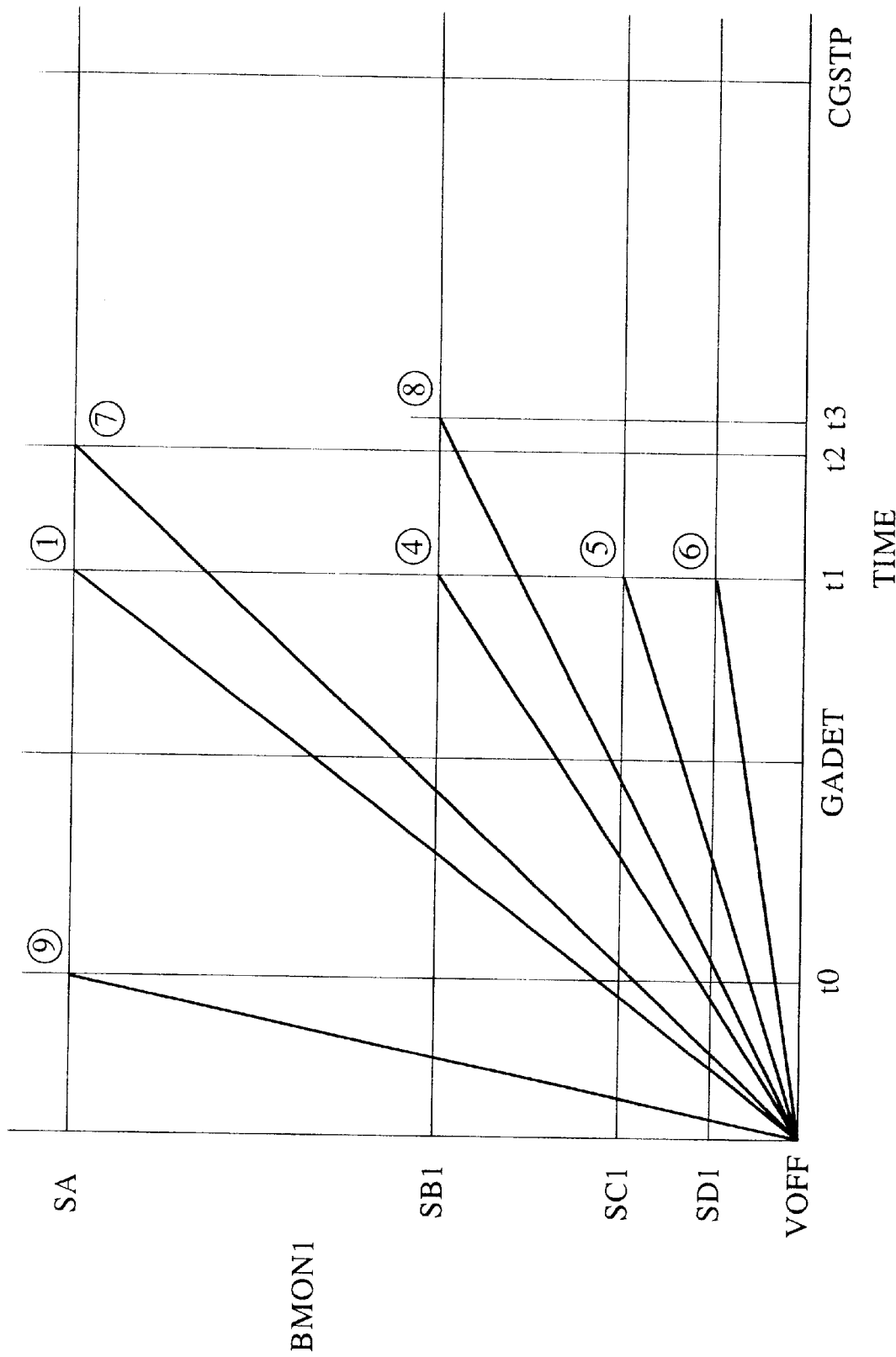
FIG. 11 is a plot of storage monitor signal for various conditions.

Now, FIG. 11 is referred to.

As in FIG. 10, FIG. 11 also illustrates the storage monitor signal output voltage BMON1 for various amounts of light striking the line sensor 1 whereas the amounts of light are different from those in FIG. 10.

Line 1 represents monitor signal output voltage at BMON1 which is the same as line 1 shown in FIGS. 9 and 10. In the case of line 4, the monitor signal output voltage obtained at time GADET falls within SB1 level range and thus an amplification gain corresponding to SB1 level is selected. Similarly, gains of image signal amplification corresponding to SC1 level and SD1 level are selected for line 5 and line 6, respectively.

In all cases of lines 4, 5, and 6, the storage operation is completed at time t1, and the difference in the amount of light is compensated by image signal amplification with properly selected gains.

In the case of line 7, the monitor signal output voltage obtained at time GADET falls within SA level range and thus the amplification gain corresponding to SA level is selected. However, in this case, the monitor signal output voltage obtained at time t1 is lower than SA level, and thus the storage operation is completed at time t2. Compensation for the difference in the amount of light relative to line 1 is made by employing a longer storage time in this case.

In the case of line 8, the monitor signal output voltage obtained at time GADET falls within SB level range and thus the amplification gain corresponding to SB level is selected. However, the monitor signal output voltage obtained at time t1 is lower than SA level, and the storage operation is completed at time t3. Compensation for the difference in the amount of light relative to line 1 is made by employing a longer storage time and also by selecting a proper image amplification gain.

In the case of line 9, the monitor signal output voltage reaches SA level at time t0 which is earlier than time t1 and thus the storage operation is completed at time t0. When the storage operation is completed earlier than time GADET as in this case, the image signal is amplified by the gain corresponding to SA level. Compensation for the difference in the amount of light relative to line 1 is accomplished by employing a shorter storage time in this case.

As described above, in all cases of lines 1 through 9, the difference in the monitor signal output voltage due to the difference in the amount of light is compensated by selecting a proper storage time or a proper amplification gain, or by selecting both proper storage time and amplification gain, depending on the amount of light so that the same image signal output is obtained after amplification.

Figure 12:
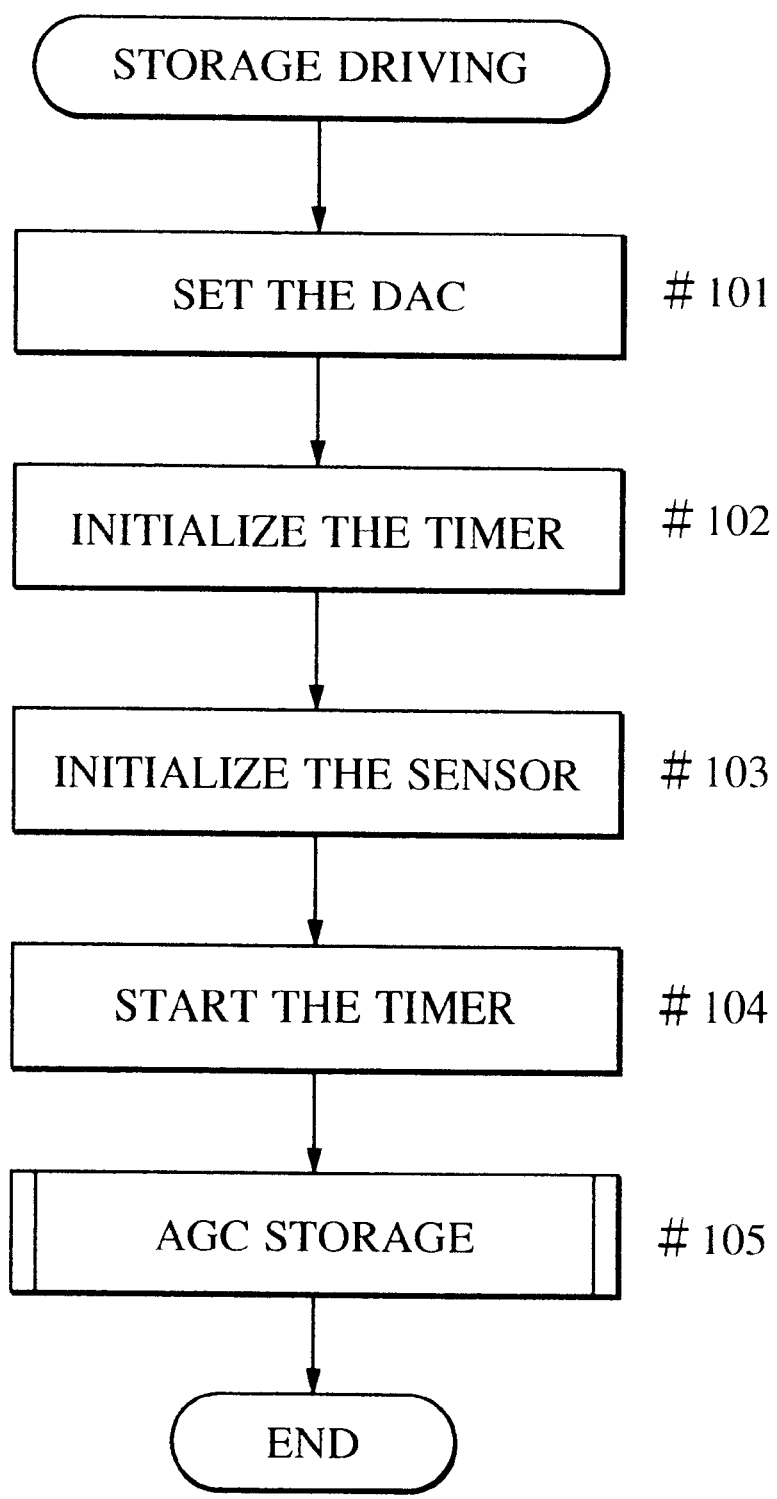
FIG. 12 is a flow chart of a storage operation.

Now, FIG. 12 is referred to.

FIG. 12 is a flow chart of a storage operation of a photoelectric conversion element, which is one of the processes performed during a focus detecting operation in the camera shown in FIG. 1.

First, adjustment factors stored in memory of the computer PRS are transferred to the DA converter DAC in the sensor driver SDR so as to perform setting of output levels of DACOUT1 through DACOUT3 (step 101).

Depending on the operation conditions of the sensor SNS, the adjustment factors for the DA converter are selected from a plurality of predefined values so as to optimize the storage operation.

Then, a timer (not shown) installed in the computer PRS is initialized (step 102).

The timer monitors time elapse and if time elapse of GADET or CGSTP is detected the timer notifies the sensor driver SDR of that fact.

The sensor SNS is then initialized (step 103). The photoelectric conversions elements of the sensor SNS are always illuminated with light, and thus unnecessary charges are always generated. These unwanted charges are removed by the initialization.

After the initialization of the sensor SNS, the timer that has already been initialized starts measurement of the storage time (step 104).

If the storage timer detects time elapse of GADET, an AGC storage operation is performed so as to select gains associated with the image signal amplification depending on the storage monitor output signals BMON1 through BMON6 (step 105).

After the completion of the storage operation described above, the image signal is read and various operations associated with focus detection are performed.

The AGC storage operation is described below.

Figure 13:
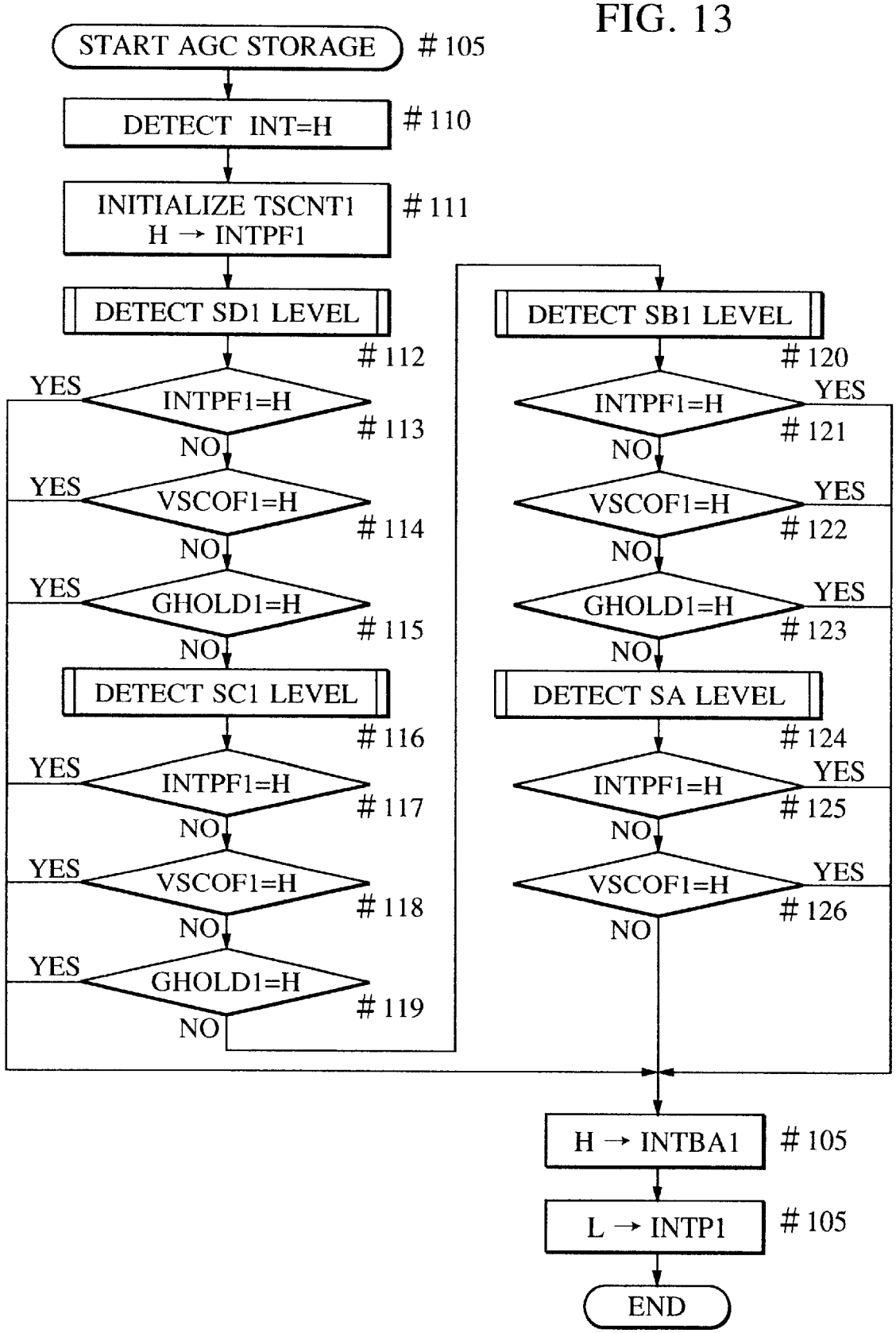
FIG. 13 is a flow chart of an AGC storage operation.

FIG. 13 is a flow chart of the AGC storage operation of the line sensor SNS1. Referring to the block diagram of FIG. 5 and the flow chart of FIG. 13, the AGC storage operation is described below.

First, if the block TSCNT1 detects that φINT changes from an L-level to an H-level in synchronization with φBCLK, then the block TSCNT1 starts a storage control operation (step 110).

The block TSCNT1 then initializes the internal logic control circuit in which the forced storage termination signal INTPF1 is raised up to an H-level (step 111).

SD1 level detection is then performed (step 112) by comparing the storage monitor signal BMON1 with SD1 level wherein SD1 level is one of the four analog output levels SA, SB1, SC1, and SD1 which have been defined previously taking into account the level of the DA converter output DACOUT1 as well as the AREF level GLR. SD1 level detection will be described in greater detail later.

After the completion of the SD1 level detection, the forced storage termination signal INTPF1 is examined so as to know the status at the completion of the SD1 level detection.

A high-to-low transition of φINTP1 is detected during the SD1 level detection operation, then INTPF1='H'. In this case, the process proceeds to a step for terminating the storage operation. If INTPF1 is not equal to 'H', then it is checked whether VSCOF1='H' (step 113).

If the block TSCNT1 detects a low-to-high transition of the output VSCO1 of the comparator VSCP1, then VSCOF1 changes to 'H'. If BMON1 is lower than the analog output VSR of the block AREF, VSCO1 changes from 'L' to 'H'. In this case, the photoelectric conversion element of the line sensor SNS1 has an output level slightly lower than the saturation level and thus storage termination operation is started.

In the initialization, BMONL is set so that the initialized output level of BMON1 $V_{OFF}$ is higher than VSR. If VSCOF1='L', then the storage operation is continued further (step 114).

In this case, the block TSCNT1 knows that the monitor signal BMON1 becomes greater than SD1 level by detecting a low-to-high transition of the output BLCO1 of the comparator GLCP1.

Then, it is checked whether a signal GHOLD1 (not shown) is at an H-level.

If the block TSCNT1 detects a high-to-low transition of the signal INTM, GHOLD1 goes to an H-level. The signal INTM changes from an H-level to an L-level when the storage time reaches GADET (step 115).

If GHOLD1 is not equal to 'H', then the storage operation is continued further.

The storage monitor signal BMON1 is now greater than SD1 level, and thus the monitor signal BMON1 is compared with SC1 level (step 116) as will be described in detail later.

After the SC1 level detection operation, the status at the completion of the SC1 level detection is examined as in the case of SD1 level detection. First, INTPF1 is checked (step 117).

The checking of INTPF1 has been described already (step 113), and thus it is not described here again.

VSCOF1 is then checked (step 118).

The checking of VSCOF1 has also been described already (step 114), and thus is not described here again.

GHOLD1 is then checked (step 119).

The checking of GHOLD1 has been described already (step 115), and thus is not described here again.

Because the storage monitor signal BMON1 is now greater than SC1 level, the monitor signal BMON1 is compared with SB1 level (step 120) as will be described in detail later.

After the completion of the SB1 level detection, the status at the completion of the SB1 level detection is examined as in the case of SC1 level detection.

Steps 121 through 123 are performed in the same manner as in steps 117 through 119, and are not described here again.

The storage monitor signal BMON1 is now greater than SB1 level, and thus the monitor signal BMON1 is compared with SA level (step 124) as will be described in detail later.

After the completion of the SA level detection, the status at the completion of the SA level detection is examined.

Steps 125 and 126 are performed in the same manner as in steps 117 and 118, and are not described here again.

Now, the storage operation is terminated.

First, the signal INTBA1 is raised to an H-level so as to notify the sensor SNS that the detection of the monitor signal BMON1 indicates that the storage operation should be now terminated (step 127).

The signal INTP1 is then lowered to an L-level thereby notifying the block MCT of the completion of the storage operation so that the MCT can start to read stored charges as an image signal from the line sensor SNS1 (step 128).

Thus, the AGC storage operation is complete.

The SD1 level detection operation which is one of the steps of the AGC storage operation is described below.

Figure 14:
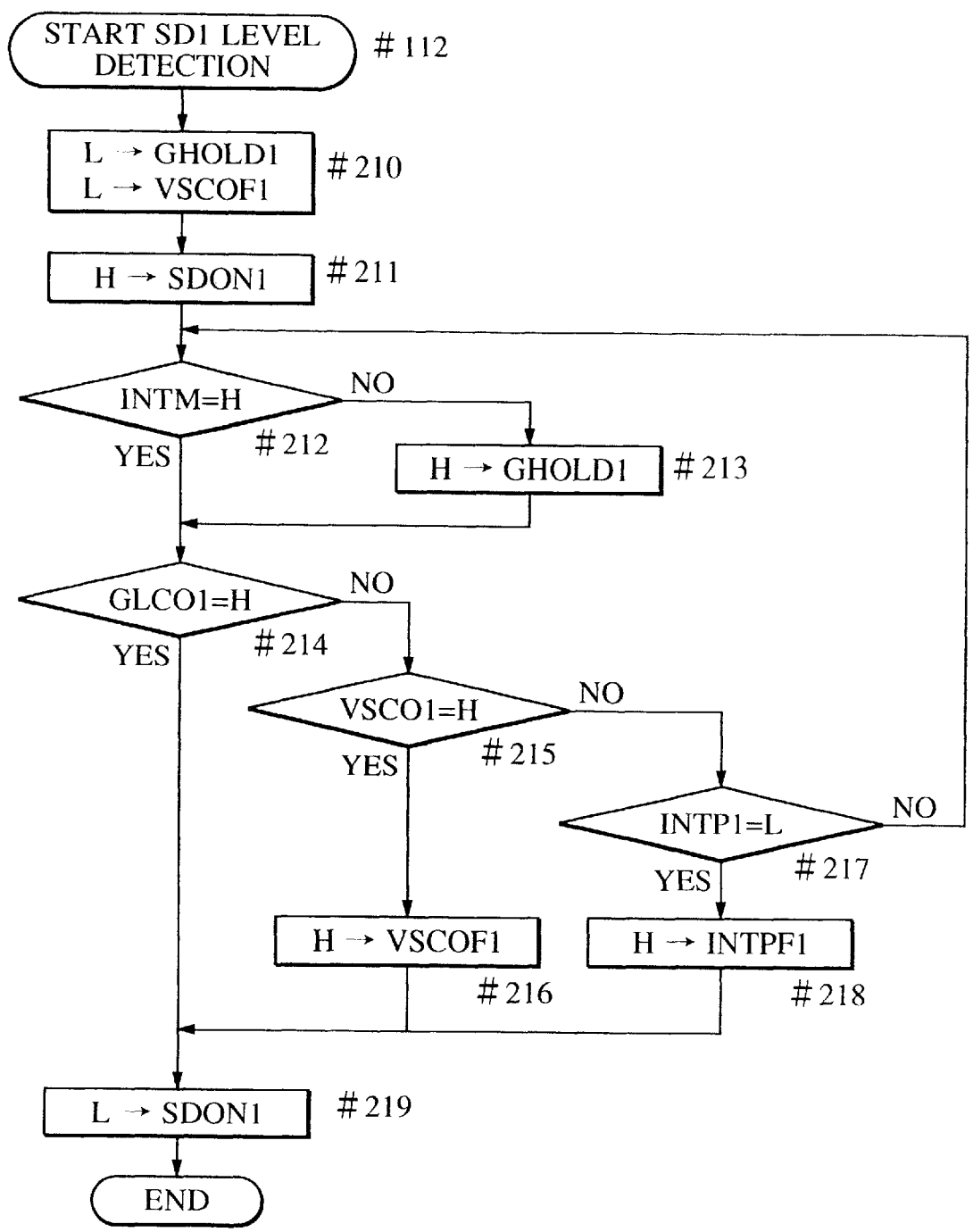
FIG. 14 is a flow chart of the operation of a block associated with the AGC storage.

FIG. 14 is a flow chart of the SD1 level detection operation. Referring to the block diagram of FIG. 5 and the flow chart of FIG. 14, the SD1 level detection operation is described below.

First, the block TSCNT1 initializes the signals CHOLD1 and VSCOF1, that is, these signals are set to an L-level.

When a high-to-low transition of the signal INTM in response to φBCLK is detected, a low-to-high transition of the signal GHOLD1 occurs.

The signal INTM generated by the block MCT changes from an H-level to an L-level at time GADET. The signal VSCOF1 changes form an L-level to an H-level when a low-to-high transition of the output signal VSCO1 of the comparator VSCP1 is detected in synchronization with φBCLK (step 210).

The signal SD1 is then changed from an L-level to an H-level so as to set the reference level GLREF1 of the comparator GLCP1 to SD1 level. If SD1 is set to the H-level, then the analog switch ASWD1 is turned on whereby GLREF1 is set to SD1 level (step 211).

Whether the storage time reaches GADET is monitored by monitoring the input signal INTM. If it is detected that INTM='H', signal GHOLD1 is set to an H-level (step 213), and then the process proceeds to the next step. If it is turned out that INTM='L', then the process proceeds directly to the next step (step 212).

It is checked whether the output GLCO1 of the comparator GLCP1 is at an H-level (step 214).

If it is concluded that GLCO1='H', then the process proceeds to a step for terminating the SD1 level detection.

On the other hand, if GLCO1='L', then it is checked whether the output signal VSCO1 of the comparator VSCP1 is 'H' (step 215).

If VSCO1='H', then the signal VSCOF1 is set to 'H' thereby indicating that VSCO1='H' (step 216). Then, the process proceeds to a step for terminating the SD1 level detection.

If VSCO1 is not 'H', then it is checked whether the signal INTP1 is at an L-level (step 217).

If it is concluded that INTP1='L', the signal INTPF1 is set to an H-level thereby indicating that INTP1='L' (step 218). Then, the process proceeds to a step for terminating the SD1 level detection.

On the other hand, if it is concluded that INTP is not 'L', then the process returns to step 212 (step 217).

Before completing the SD1 level detection, the block TSCNT1 changes the signal level of SDON1 from 'H' to 'L' thereby turning off the analog switch ASWD1 (step 219).

Thus, the SD1 level detection is complete.

Figure 15:
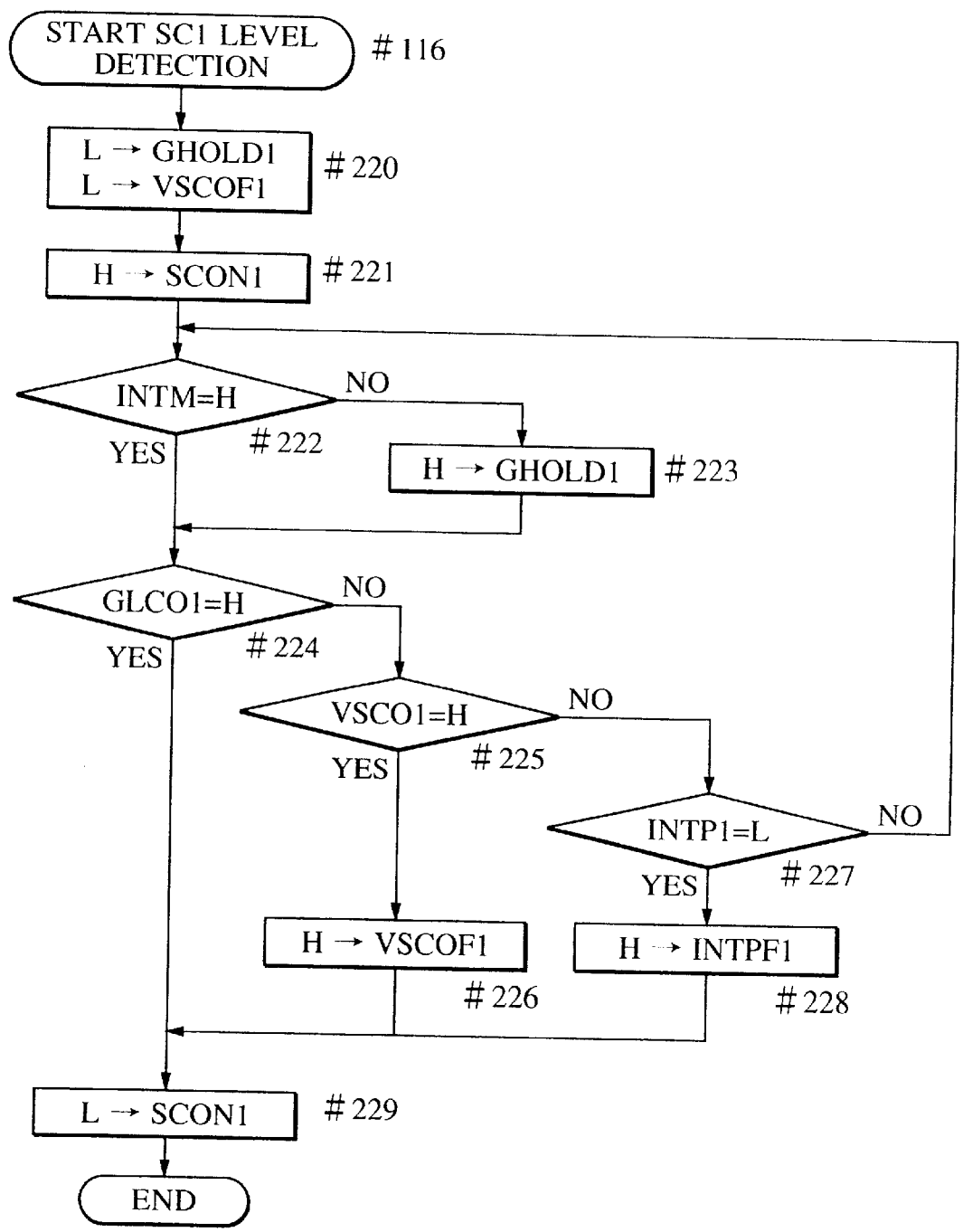
FIG. 15 is a flow chart of the operation of a block associated with the AGC storage.
Figure 16:
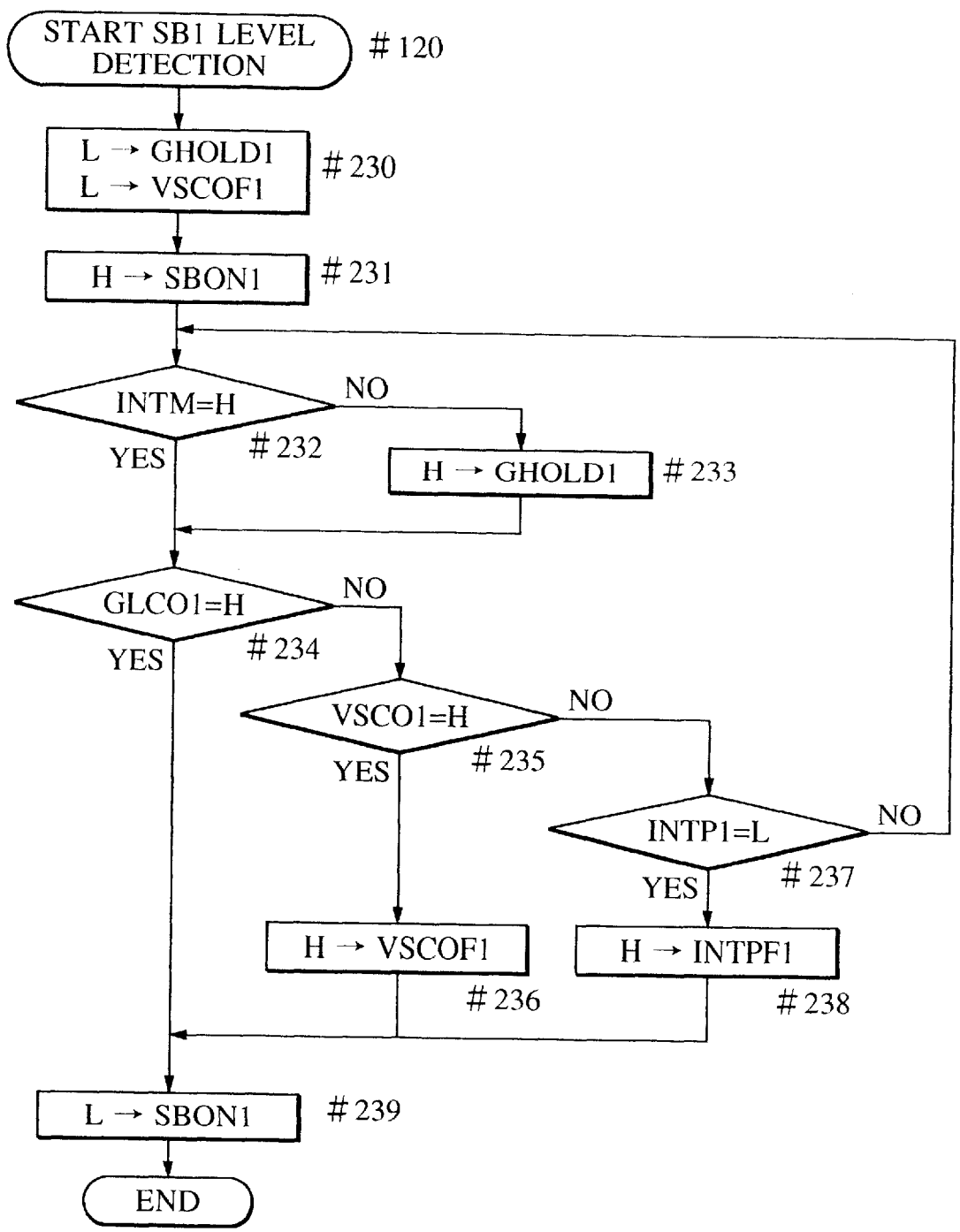
FIG. 16 is a flow chart of the operation of a block associated with the AGC storage.
Figure 17:
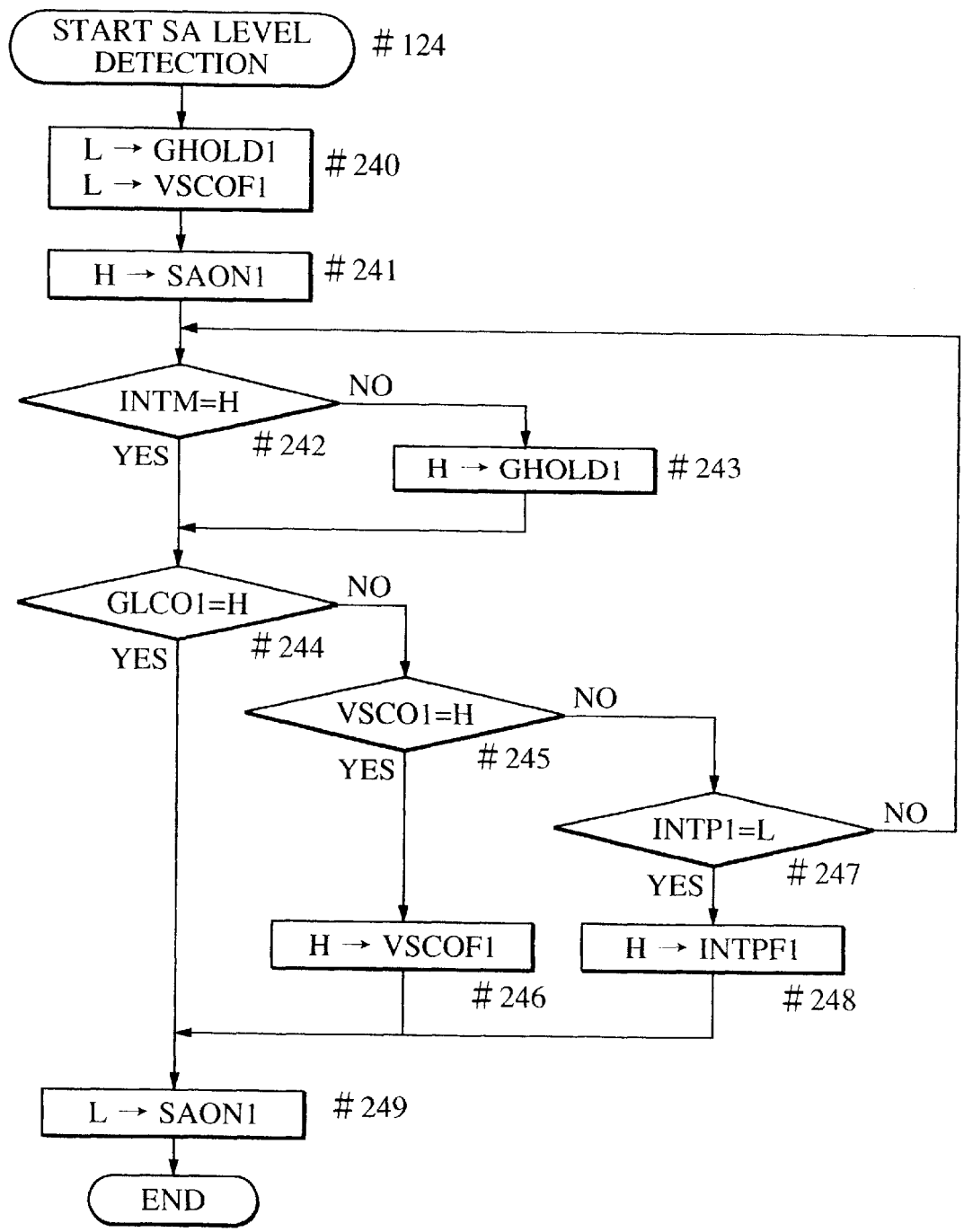
FIG. 17 is a flow chart of the operation of a block associated with the AGC storage.

FIGS. 15, 16, and 17 illustrate operation flows associated with SC1, SB1, and SA level detection operations, respectively. These level detection operations are performed in the same manner as the SD1 level detection except that the reference level of the comparator GLCP1 is set to SC1, SB1, and SA levels, respectively.

That is, in the SC1 level detection operation, the analog switch ASWC1 is on-off controlled using the signal SCON1 so that GLREF1 is set to SC1 level.

In the SB1 level detection, the analog switch ASWB1 is on-off controlled using the signal SBON1 so that GLREF1 is set to SC1 level.

Similarly, in the SA level detection, the analog switch ASWA1 is on-off controlled using the signal SAON1 so that GLREF1 is set to SA level.

Thus, as illustrated in FIGS. 15, 16, and 17, these level detection operations are performed in similar manners to the SD1 level detection shown in FIG. 14, and they are not described in further detail here.

In the above description, the operation of the block GCB1 is explained. The blocks GCB2 through GCB6 operates in the same manner as the block GCB2 except that these blocks are connected to different line sensors.

Figure 18:
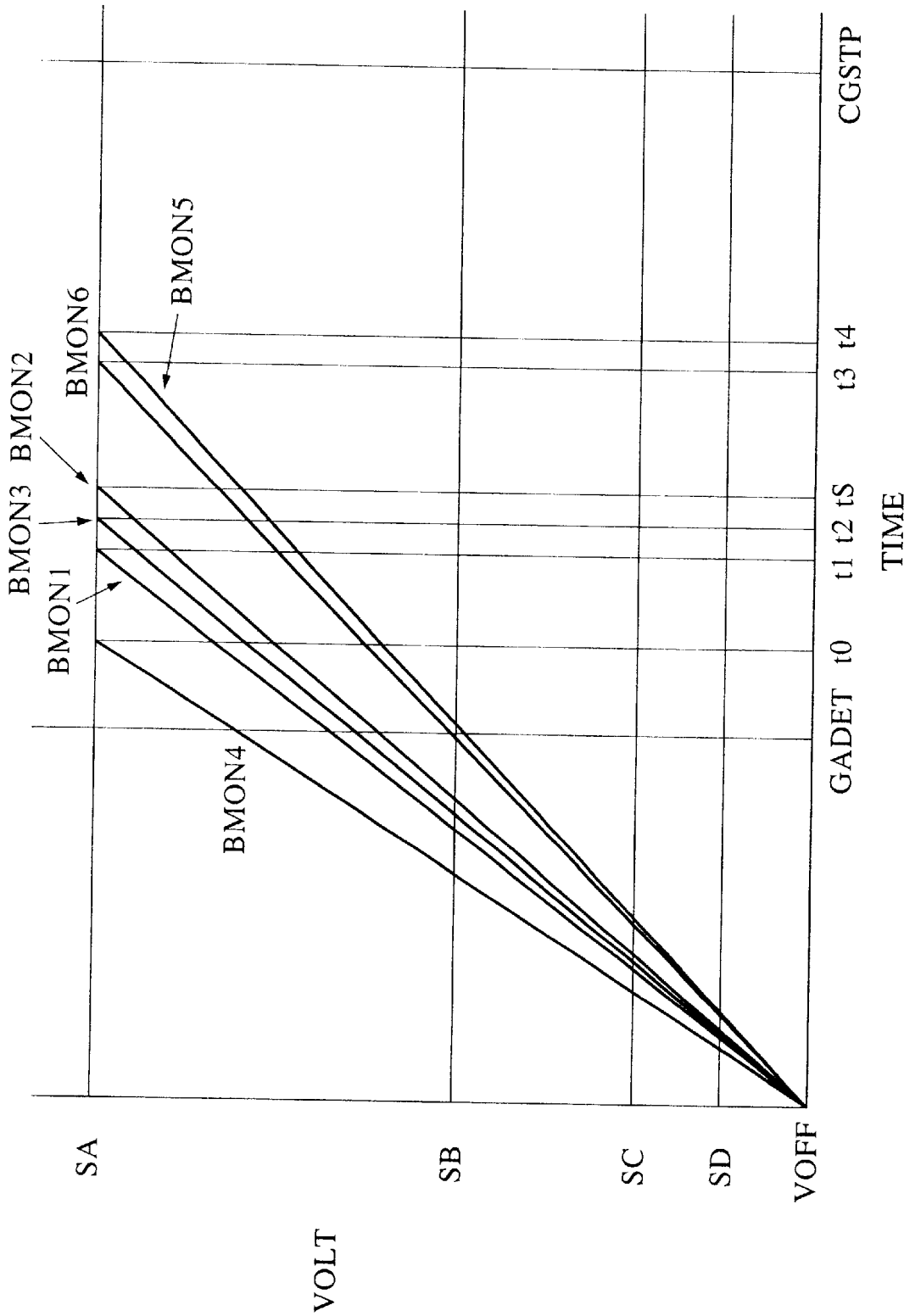
FIG. 18 is a graph of storage monitor signals obtained before AGC adjustment.
Figure 19:
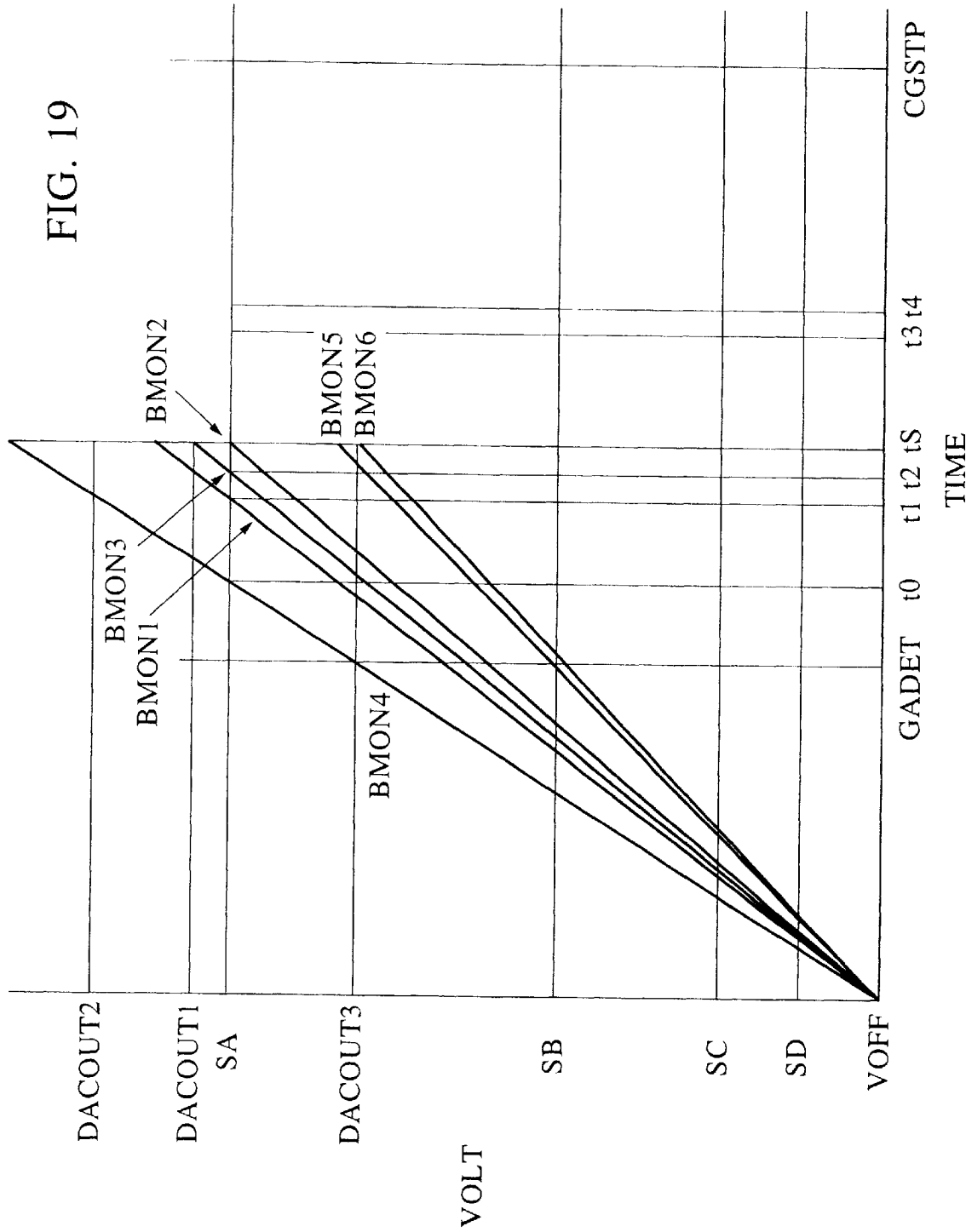
FIG. 19 is a graph of storage monitor signals obtained after AGC adjustment.

Referring to FIGS. 18 and 19, the AGC adjustment is described below.

FIG. 18 illustrates monitor signals that are obtained when the line sensors SNS1 through SNS6 are illuminated with a reference light beam having the same brightness and the same contrast. In the example shown in FIG. 18, the times at which the monitor signals reach the SA level vary form t0 to t4.

In FIG. 18, the AGC adjustment is performed by adjusting the reference level by varying the output level of the DA converter so that the storage operations of the line sensors SNS1 through SNS6 are completed at time tS.

As described earlier, the monitor signals BMON1 and BMON2 can be adjusted by DACOUT1, the monitor signals BMON3 and BMON4 by DACOUT2, and the monitor signals BMON5 and BMON5 by DACOUT3. Thus, the following equation can be obtained:

DAOUT1=SA×(tS+tS×(tS/t1))/2

DAOUT2=SA×tS((tS/t2)+(tS/t0))/2

DAOUT3=SA×((t3/tS)+(t4/tS))/2

If DACOUT1 through DACOUT3 are set so that the above equations are satisfied, then the storage operation is completed at time tS as shown in FIG. 19, and the line sensors SNS1 through SNS6 output an image signal at the same signal level. The setting conditions of DACOUT1 through DACOUT3 are stored in the EEPROM.

In the example shown in FIGS. 18 and 19, the storage control mode signal INTM shown in FIG. 4 is maintained at an H-level during a time period in which the storage signal φINT is at an H-level, that is, during a storage operation. Therefore, the AGC control is not performed and the storage operation is completed when the signal reaches SA level.

Embodiment 2

In the above-described embodiment, the optical image of the focus detection areas AFP1 and AFP2 are projected onto the sensor after passing through a common part of the lens AFFL which is an optical element of the focus detection optical system, and the optical image of the focus detection areas AFP5 and AFP4 are projected onto the sensor after passing through another common part of the lens AFFL. Therefore, the focus detection areas are grouped into three areas: left, central, and right areas on the viewfinder of the camera. Furthermore, a common storage control level is given for each group. However, the frequency in use of the focus detection areas has symmetry about the center of the viewfinder screen. Therefore, the focus detection areas may also be grouped in such a manner that the focus detection areas AFP1 and AFP5 shown in FIG. 6 are combined in one group, and AFP2 and AFP4 are combined in another group thereby providing good focus detection accuracy.

Thus, in this second embodiment, grouping of focus detection areas is discussed.

Figure 20:
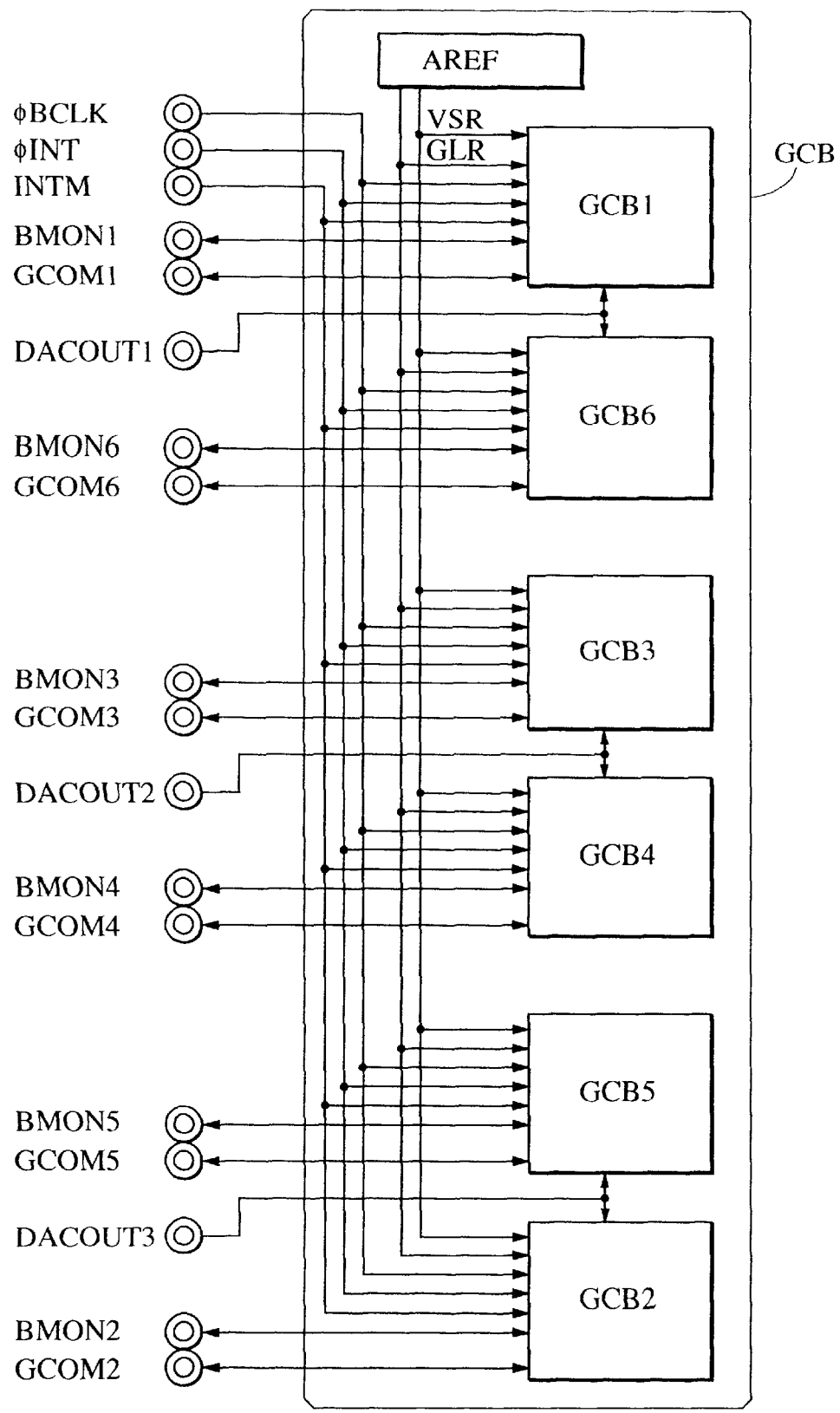
FIG. 20 is a circuit diagram in block form of a circuit block used in a camera according to a second embodiment of the present invention.

The second embodiment is best understood by referring to FIG. 20. Signals input to or output from the block GCB are substantially the same as those shown in FIG. 2 or 4.

In the case of FIG. 20, however, the outputs DACOUTI through DACOUT3 of the DA converter are connected to the blocks GCB1 through GCB6 in a manner different from the first embodiment so as to achieve different grouping of focus detection areas.

That is, DACOUT1 is connected in parallel form to GCB1 and GCB6.

DACOUT2 is connected in parallel form to GCB3 and GCB4.

DACOUT3 is connected in parallel form to GCB2 and GCB5.

Figures 21, 21A:
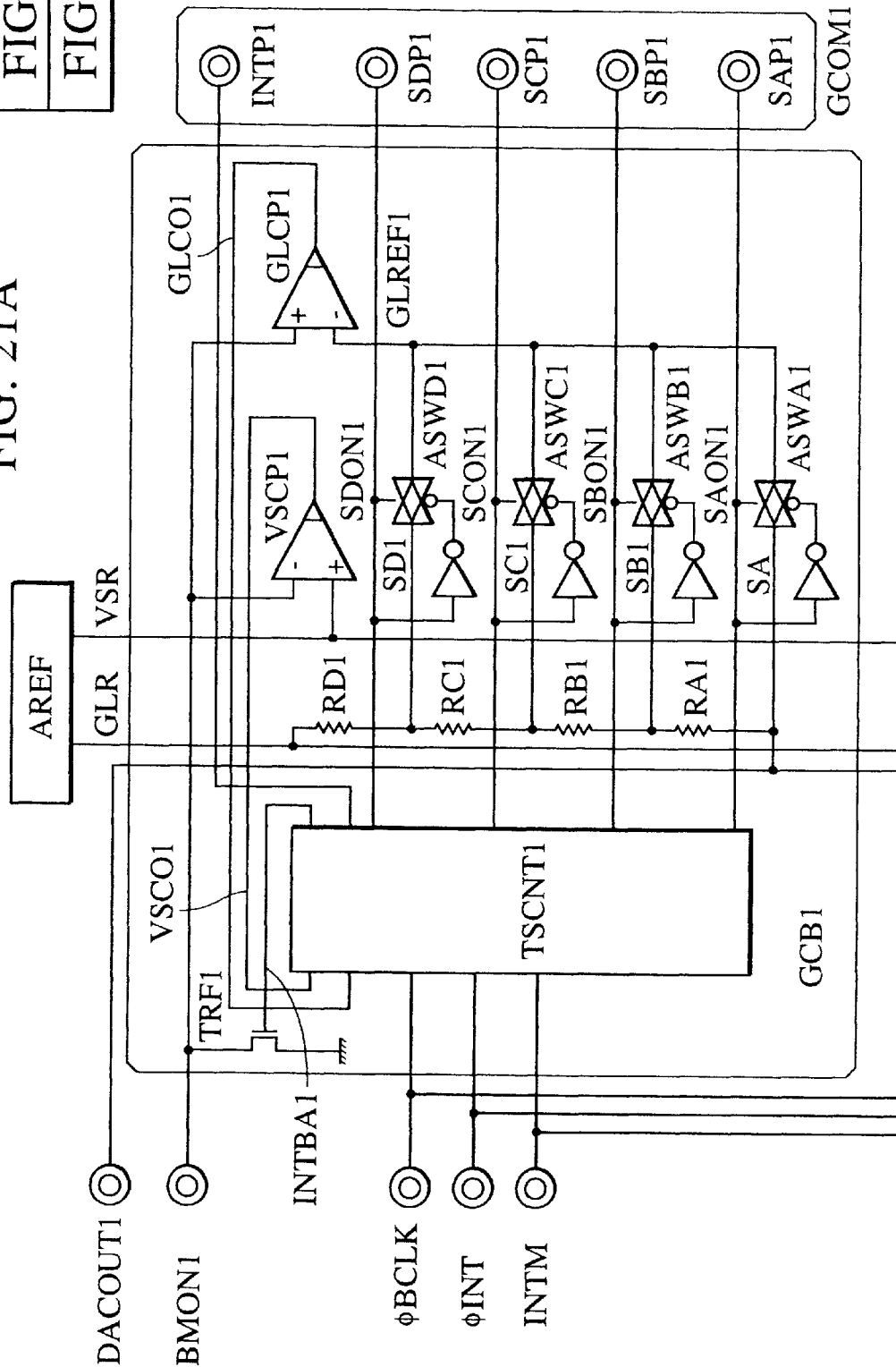
FIG. 21 is; consisting of FIGS. 21A and 21B, is a circuit diagram illustrating circuit blocks shown in FIG. 20 in greater detail.
Figure 21B:
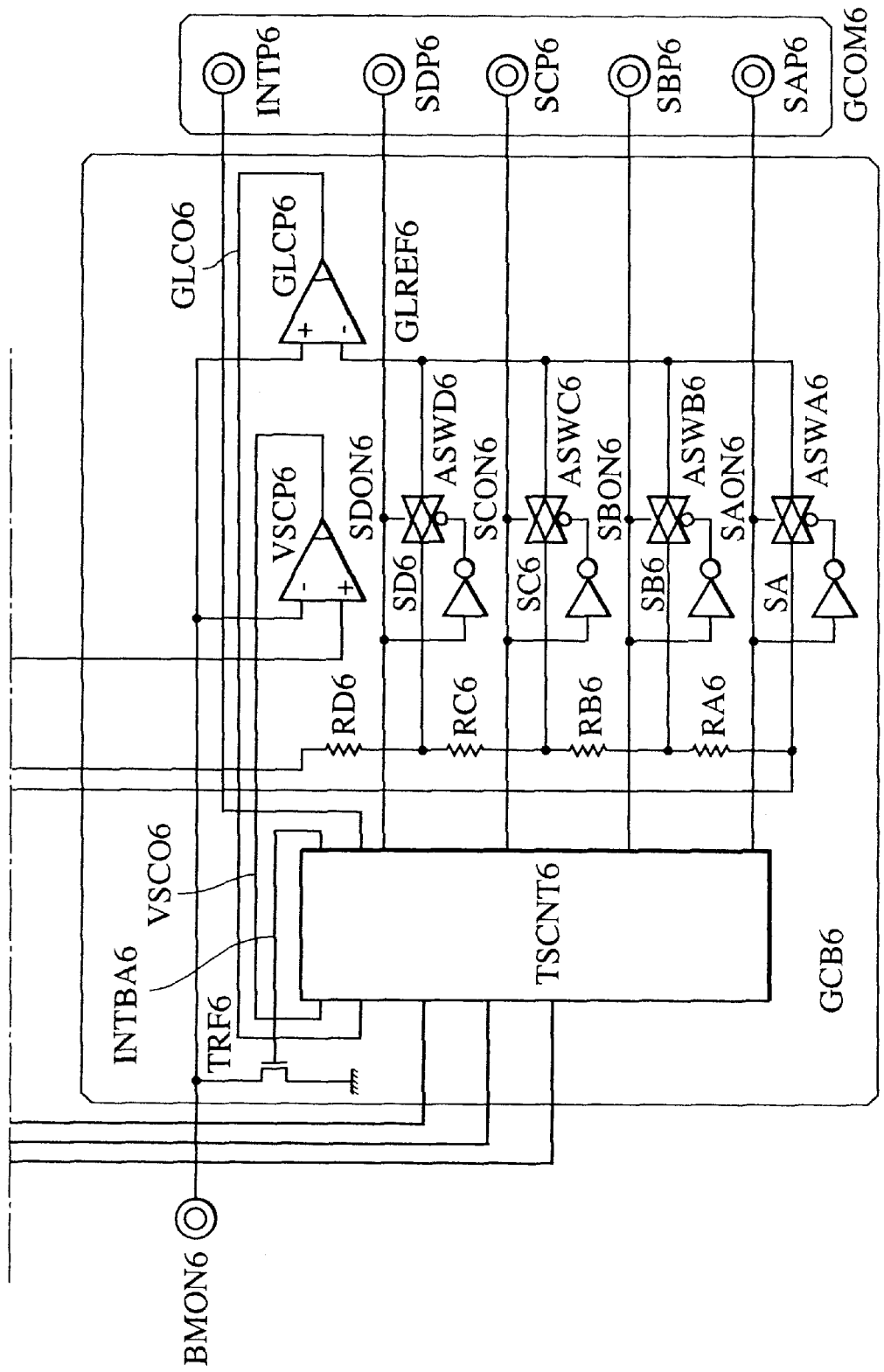
Figure 22:
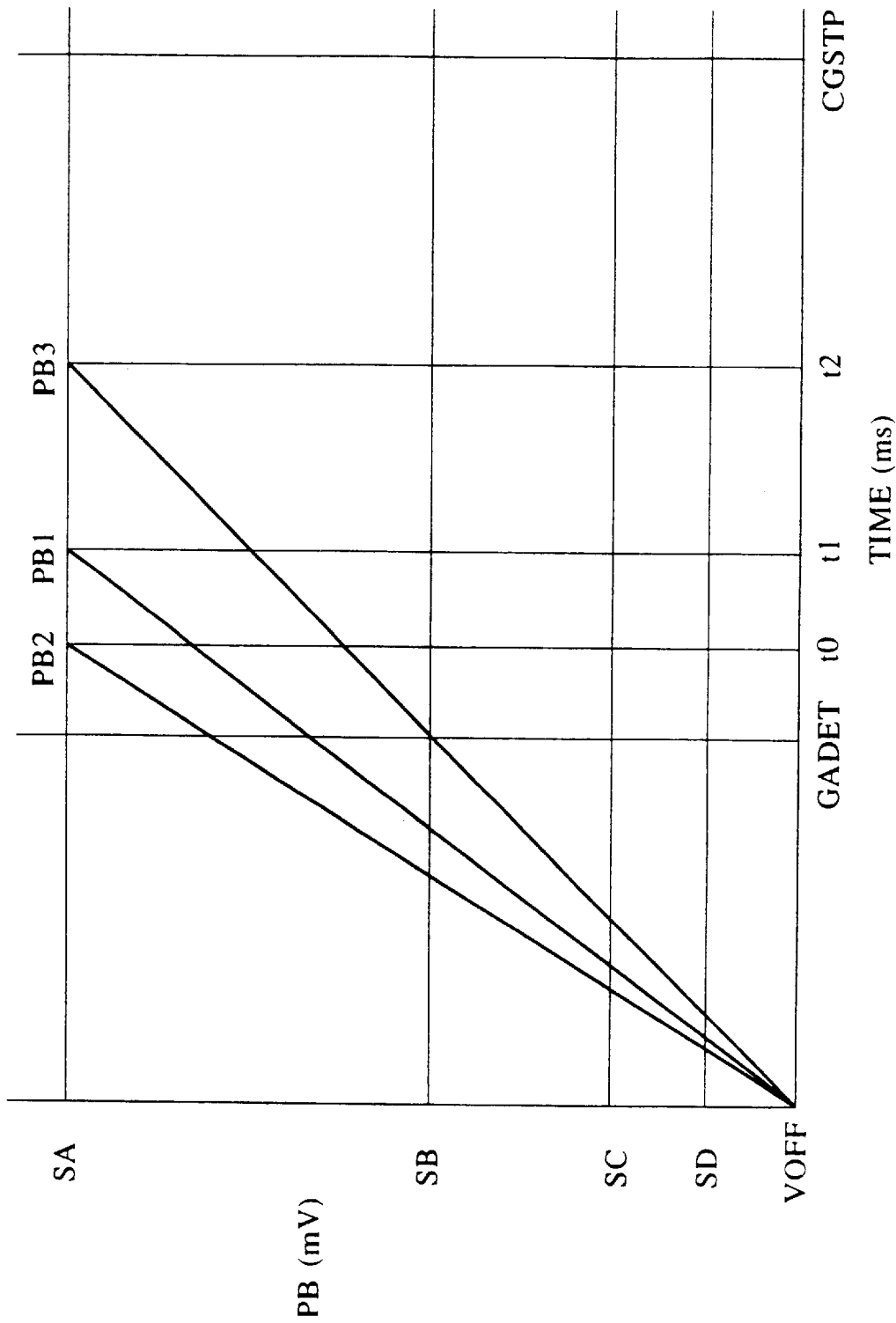
FIG. 22 is a graph illustrating a conventional AGC control technique.
Figure 23:
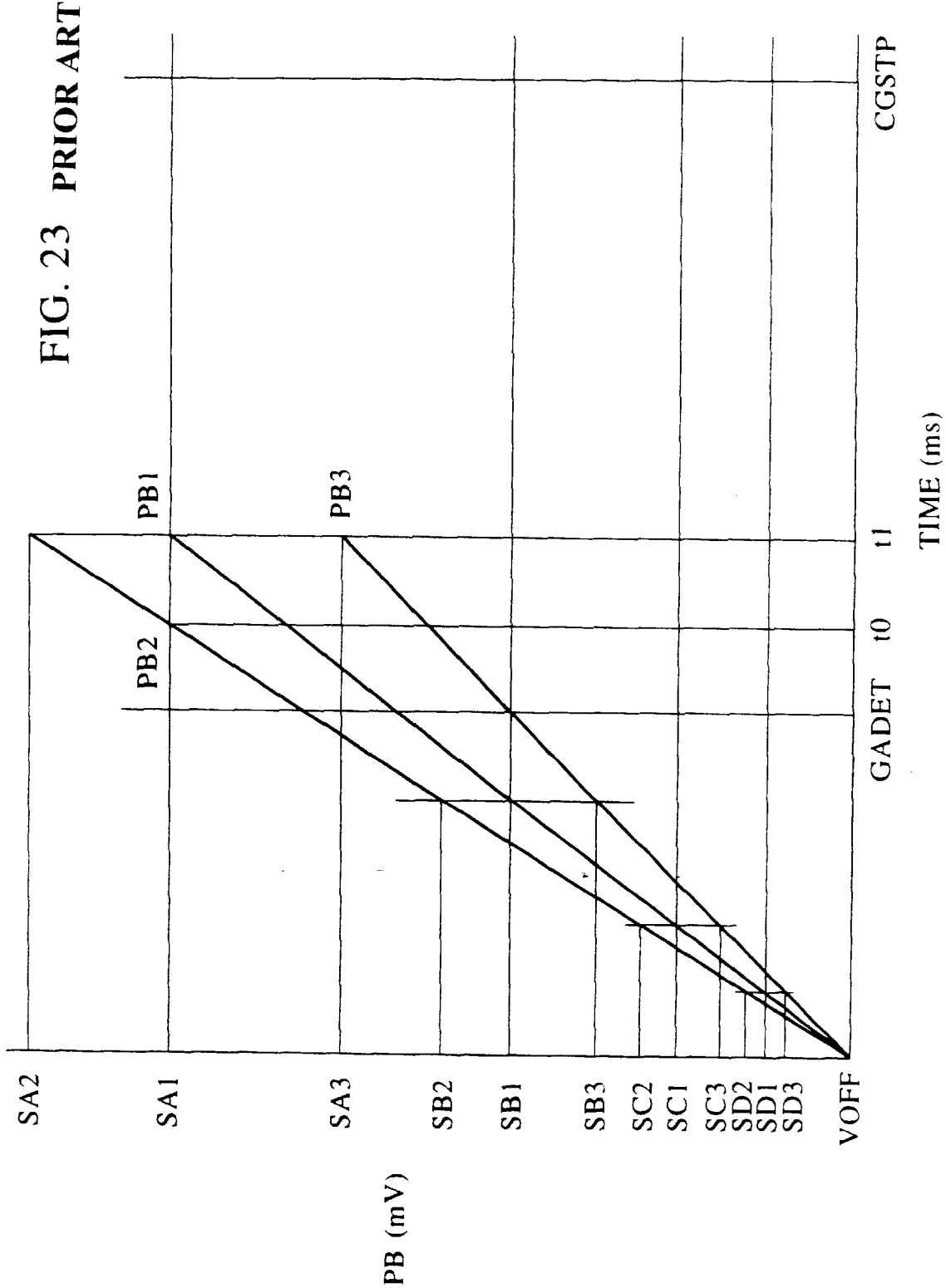
FIG. 23 is a graph illustrating the conventional AGC control technique.

Of sub-blocks forming the block GCB, GCB1 and GCB6 are illustrated in FIG. 21.

The blocks GCB1 through GCB6 operates in substantially the same manner as in the first embodiment described above, and thus they are not described here again.

CORRESPONDENCE BETWEEN GENERAL FORM OF THE INVENTION AND SPECIFIC EMBODIMENTS

In the above-described first and second embodiments of the present invention, AFP1 through AFP5 shown in the schematic representation of the viewfinder act as focus detection areas of the present invention, the line sensors SNS1 through SNS6 of the sensor SNS act as line sensors of the invention, and the outputs DACOUT1 through DACOUT3 of the DA converter in the sensor driver SDR act as storage control levels of the invention.

The present invention is not limited to the specific embodiments described above. Various modifications and changes may be made without departing from the spirit and scope of the appended claims.

For example, the number of line sensors included in the sensor is not limited to the specific number described above in the embodiment. Any number of line sensors may be employed in the invention as long as a plurality of pairs of the line sensors is included in the sensor. The present invention may be applied not only to single-lens reflex cameras but also various types of cameras such as video cameras or cameras of the type in which a lens and a shutter are disposed in a one-piece unit. Furthermore, the present invention may also be applied to various optical apparatus other than cameras as long as they have a storage control device associated with photoelectric conversion devices.

In the storage control device associated with photoelectric conversion devices according to the present invention, as described above, the storage control level is separately adjusted for each line sensor group of a plurality of line sensor groups so that each adjusted storage control level is commonly used in line sensors included in that line sensor group. The storage control device of the invention can be advantageously used in focus detecting devices without either a reduction in production yield of sensors or an increase in cost.

In the focus detecting device according to the present invention, the storage control level is separately adjusted for each line sensor group of a plurality of line sensor groups so that each adjusted storage control level is commonly used in line sensors included in that line sensor group, and thus a storage control level setting circuit is provided in each line sensor group rather than in each line sensor. Thus, in the focus detecting device of the invention, the circuit used needs less complexity, and the memory for storing adjustment parameters needs less capacity, which results in lower power consumption.

In the camera or image pickup apparatus according to the present invention, the storage control level is separately adjusted for each line sensor group of a plurality of line sensor groups so that each adjusted storage control level is commonly used in line sensors included in that line sensor group. This allows improvement in variation of focus detection accuracy among focus detection areas thereby providing high precision focus detection in the camera.

What is claimed is:

1. A storage control device associated with photoelectric conversion elements, said storage control device comprising:
   a plurality of line sensor groups, at least one of said line sensor groups including a plurality of line sensors in which each line sensor corresponds to a respective different image detection area, and each line sensor including a plurality of photoelectric conversion elements;
   storage control means associated with said photoelectric conversion elements; and
   bi-directional communication means for performing a bi-directional communication with said storage control means, wherein said plurality of line sensor groups and said bi-directional communication means are arranged in a same image sensor device,
   wherein said storage control means associated with the photoelectric conversion elements performs storage control through said bi-directional communication means in said image sensor device, said storage control being performed separately and sequentially for each line sensor group through said bi-directional communication means in said image sensor device using storage control data that is generated for each line sensor group, respectively.

2. A focus detection device comprising:
   a plurality of line sensors each including a plurality of photoelectric conversion elements;
   storage control means for performing storage control associated with said photoelectric conversion elements;
   bi-directional communication means for performing a bi-directional communication with said storage control means, wherein said plurality of line sensors and said bi-directional communication means are arranged in a same image sensor device; and
   a plurality of focus detection areas corresponding to respective line sensors,
   wherein said plurality of focus detection areas are grouped into a plurality of focus detection area groups the number of which is smaller than the number of focus detection areas, said storage control means associated with the photoelectric conversion elements performs storage control through said bi-directional communication means in said image sensor device, and said storage control is performed separately and sequentially for each focus detection area group through said bi-directional communication means in said image sensor device using a storage control level that is adjusted separately for each focus detection area group.

3. A camera provided with the focus detection device according to claim 2.

4. An image pickup apparatus comprising:
   N image sensing devices each of which corresponding to a respective different image detection area, N being an integer greater than 3, said N image sensing devices being grouped into M groups, M being an integer smaller than N;
   control means for controlling output levels of said N image sensing devices; and
   bi-directional communication means for performing a bi-directional communication with said control means, wherein said N image sensing devices and said bi-directional communication means are arranged in a same image sensor device,
   wherein said control means controls output levels of said N image sensing devices through said bi-directional communication means in said image sensor device, the output level control being performed separately and sequentially for each said group through said bi-directional communication means in said image sensor device.

5. An image pickup apparatus according to claim 4, wherein said control means includes means for controlling storage times of the image sensing devices.

6. An image pickup apparatus according to claim 4, wherein said plurality of image sensing devices included in each said group are disposed adjacent to each other.

7. An image pickup apparatus comprising:
   N image sensing devices;
   control means for controlling output levels of said N image sensing devices; and
   bi-directional communication means for performing a bi-directional communication with said control means, wherein said N image sensing devices and said bi-directional communication means are arranged in a same image sensor device,
   wherein said control means controls output levels of said N image sensing devices through said bi-directional communication means in said image sensor device, the output level control being performed separately and sequentially for said N image sensing devices through said bi-directional communication means in said image sensor device.

8. An image pickup apparatus according to claim 7, wherein said N image sensing devices include line sensors.

9. An image pickup apparatus according to claim 7, wherein said control means performs a predetermined signal processing on output signals of said N image sensing devices.

10. An image pickup apparatus according to claim 9, wherein said predetermined signal processing includes focus detection.

11. An image pickup apparatus connected to a control apparatus comprising:
   a plurality of image sensing means for photoconverting an optical image into an image signal; and
   bi-directional communication means for performing bi-directional communication with control means, wherein said plurality of image sensing means and said bi-directional communication means are arranged in a particular image sensing device,
   wherein output levels of said plurality of image sensing means are controlled by said control means through said bi-directional communication means in said image sensing device,
   wherein said output level control is performed separately and sequentially for said plurality of image sensing means through said bi-directional communication means.

12. An image pickup apparatus according to claim 11, wherein said plurality of image sensing means include line sensors.

13. An image pickup apparatus according to claim 11, wherein said control means performs predetermined signal processing on output signals of said plurality of image sensing means.

14. An image pickup apparatus according to claim 13, wherein said predetermined signal processing includes focus detection.

15. A control apparatus connected to an image pickup apparatus according to claim 11, wherein said control apparatus includes a CPU for controlling a storage operation of said image pickup apparatus through said by-directional communication means.

16. A control apparatus according to claim 15, further comprising a RAM and a ROM to store information for controlling said image pickup apparatus.

* * * * *

UNITED STATES PATENT AND TRADEMARK OFFICE
CERTIFICATE OF CORRECTION

PATENT NO. : 6,310,649 B1
DATED : October 30, 2001
INVENTOR(S) : Shinichi Hagiwara It is certified that error appears in the above-identified patent and that said Letters Patent is hereby corrected as shown below:

Column 4,
Line 51, "camera." should read -- camera; --;
Line 59, "signal" should read -- signals --; and
Line 61, "signal" should read -- signals --.

Column 5,
Line 14, "21 is;" should read -- 21, --.

Column 6,
Line 11, "is" should be deleted.

Column 12,
Line 49, "BMONL" should read -- BMON1 --.

Column 14,
Line 2, "INTP1. If" should read -- INTP1. ¶ If --.

Column 15,
Line 34, "illustrate" should read -- illustrates --.

Column 17,
Line 45, "BMONL" should read -- BMON1 --.

Column 19,
Line 58, "DAOUT1" should read -- DACOUT1 --;
Line 59, "DAOUT2" should read -- DACOUT2 --; and
Line 60, "DAOUT3" should read -- DACOUT3 --.

Column 20,
Line 33, "grouping" should read -- groupings --.

UNITED STATES PATENT AND TRADEMARK OFFICE
CERTIFICATE OF CORRECTION

PATENT NO. : 6,310,649 B1
DATED : October 30, 2001
INVENTOR(S) : Shinichi Hagiwara It is certified that error appears in the above-identified patent and that said Letters Patent is hereby corrected as shown below:

Column 22,
Line 50, "devices;" should read -- devices, wherein N is an integer greater than 2; --.

Signed and Sealed this

Eleventh Day of March, 2003

JAMES E. ROGAN
*Director of the United States Patent and Trademark Office*